United States Patent
Yoshida et al.

(10) Patent No.: US 12,175,121 B2
(45) Date of Patent: *Dec. 24, 2024

(54) MEMORY SYSTEM AND CONTROL METHOD

(71) Applicant: Kioxia Corporation, Tokyo (JP)

(72) Inventors: Hideki Yoshida, Yokohama Kanagawa (JP); Shinichi Kanno, Ota Tokyo (JP); Naoki Esaka, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,617

(22) Filed: Aug. 4, 2023

(65) Prior Publication Data
US 2023/0376239 A1 Nov. 23, 2023

Related U.S. Application Data

(63) Continuation of application No. 17/684,551, filed on Mar. 2, 2022, now Pat. No. 11,762,580.

(30) Foreign Application Priority Data

Apr. 30, 2021 (JP) .................................. 2021-077725

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)
(58) Field of Classification Search
USPC ....................................................... 711/154
See application file for complete search history.

(56) References Cited

U.S. PATENT DOCUMENTS

| | | | |
|---|---|---|---|
| 11,586,385 B1 | 2/2023 | Lercari et al. | |
| 11,762,580 B2 * | 9/2023 | Yoshida | G06F 3/0644 |
| | | | 711/154 |
| 2015/0269081 A1 | 9/2015 | Shu et al. | |
| 2019/0317691 A1 | 10/2019 | Kanno | |
| 2020/0089407 A1 | 3/2020 | Baca et al. | |
| 2020/0409589 A1 | 12/2020 | Bennett et al. | |
| 2021/0223962 A1 | 7/2021 | Esaka et al. | |

(Continued)

OTHER PUBLICATIONS

Hellwig et al., "Zoned Namespace Command Set Specification" 4053—Zoned Namespaces, NVM ExpressTM, NVM Express Workgroup c/o VTM Group., 3855 SW 153rd Drive Beaverton, OR 97003 USA, Revision 1.0, Jun. 4, 2020 (change date Jun. 15, 2020).

*Primary Examiner* — Than Nguyen
(74) *Attorney, Agent, or Firm* — Foley & Lardner LLP

(57) ABSTRACT

A controller manages a plurality of block groups each including one or more blocks among a plurality of blocks provided in a non-volatile memory. The controller assigns one of the plurality of block groups to each of plurality of zones. The controller writes write data which is to be written to a first zone to a shared write buffer and writes write data which is to be written to a second zone to the shared write buffer. When a total size of the write data in the first zone stored in the shared write buffer reaches a capacity of the first zone, the controller copies the write data in the first zone stored in the shared write buffer to the first block group assigned to the first zone.

20 Claims, 25 Drawing Sheets

(56) References Cited

U.S. PATENT DOCUMENTS

| | | | |
|---|---|---|---|
| 2021/0255803 A1* | 8/2021 | Kanno | .................... G06F 3/061 |
| 2021/0263674 A1 | 8/2021 | Shin et al. | |
| 2022/0244869 A1 | 8/2022 | Kanteti | |
| 2022/0300182 A1* | 9/2022 | Esaka | ................... G06F 3/0659 |
| 2023/0091792 A1* | 3/2023 | Kanno | ................. G06F 3/0679 |
| | | | 711/103 |

* cited by examiner

FIG. 8

Z2P TABLE 31

| | |
|---|---|
| zone #0 | PBA (SB IDENTIFIER) |
| zone #1 | PBA (SB IDENTIFIER) |
| zone #2 | |
| zone #3 | |
| ⋮ | ⋮ |
| zone #k | PBA (SB IDENTIFIER) | imageType # MEMORY SYSTEM AND CONTROL METHOD

CROSS-REFERENCE TO RELATED APPLICATION

This application is a continuation of U.S. patent application Ser. No. 17/684,551, filed Mar. 2, 2022, which is based upon and claims the benefit of priority from Japanese Patent Application No. 2021-077725, filed Apr. 30, 2021, the entire contents of each of which are incorporated herein by reference.

FIELD

Embodiments described herein relate generally to a technique for controlling a non-volatile memory.

BACKGROUND

In recent years, memory systems equipped with a non-volatile memory have become widespread. As one of such memory systems, a solid state drive (SSD) including a NAND flash memory is known.

In non-volatile memory, when a time required from the start of writing to a block in the non-volatile memory to being in a full state where the block is filled with the data is too long, in some cases, the reliability of the block itself cannot be guaranteed.

For this reason, when an operation of writing a plurality of types of data to different blocks in the non-volatile memory is performed under the control of a host, after starting writing to a certain block before a time limit elapses, the host is required to allow the block to be in a full state. However, according to an application run by the host, in some cases, it may be difficult to allow the block to be in a full state within the time limit.

Therefore, there is a need to realize a new technology capable of alleviating a time restriction imposed on the host regarding writing.

DESCRIPTION OF THE DRAWINGS

FIG. 8 is a diagram illustrating a configuration example of a management table for managing a correspondence relationship between each of the plurality of zones and each of the plurality of block groups used in the memory system according to at least one embodiment.

DETAILED DESCRIPTION

Embodiments provide a memory system and a control method capable of alleviating a time restriction imposed on a host regarding writing.

In general, according to at least one embodiment, a memory system which can be connected to a host includes: a non-volatile memory including a plurality of blocks, each of which is a unit of an erasing operation; and a controller which is electrically connected to the non-volatile memory and manages a plurality of block groups, each of which includes one or more blocks among the plurality of blocks. The controller is configured to assign one of the plurality of block groups to each of plurality of zones, to each of which a plurality of logical address ranges obtained by dividing a logical address for accessing the memory system are assigned. The controller assigns a set of block groups selected from the plurality of block groups as a shared write buffer for temporarily storing write data which is to be written to each of the zones set to a first write mode among the plurality of zones. The controller writes the write data which is to be written to a first zone to the shared write buffer in response to receiving a write request specifying the first zone set to the first write mode among the plurality of zones from the host. The controller writes the write data which is to be written to a second zone to the shared write buffer in response to receiving the write request specifying the second zone set to the first write mode among the plurality of zones from the host. When a total size of the write data which is to be written to the first zone stored in the shared write buffer reaches a capacity of the first zone, the controller copies the write data which is to be written to the first zone stored in the shared write buffer to a first block group assigned to the first zone. When a total size of the write data which is to be written to the second zone stored in the shared write buffer reaches a capacity of the second zone, the controller copies the write data which is to be written to the second zone stored in the shared write buffer to a second block group assigned to the second zone.

Hereinafter, embodiments will be described with reference to the drawings.

Figure 1:
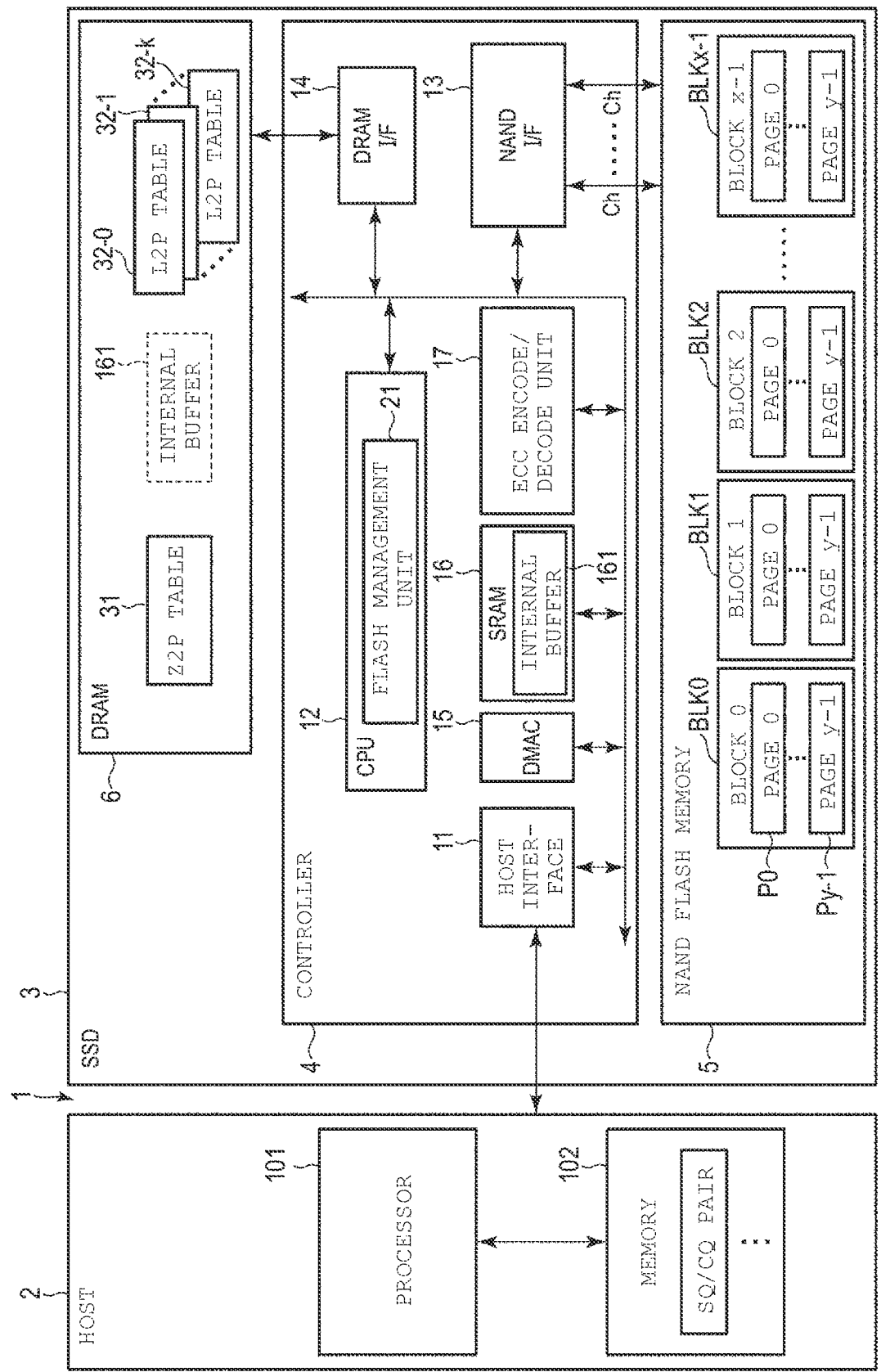
FIG. 1 is a block diagram illustrating a configuration example of a memory system according to at least one embodiment.

First, a configuration of an information processing system including a memory system according to at least one embodiment will be described. FIG. 1 is a block diagram illustrating a configuration example of an information processing system 1 including a memory system and a host according to the embodiment. In the following, it is assumed that the memory system according to the embodiment is implemented as a solid state drive (SSD) 3. The information processing system 1 includes the host (host device) 2 and the SSD 3.

The host 2 is an information processing device that controls operations of the SSD 3. Examples of the information processing device include personal computers, server computers, and various other computing devices. The host 2 transmits a write request (write command), which is a request for writing the data, to the SSD 3. Further, the host 2 transmits a read request (read command), which is a request for reading data, to the SSD 3.

The host 2 includes a processor 101, a memory 102, and the like. The processor 101 is a central processing unit (CPU) configured to control operations of each component in the host 2. The processor 101 executes software (host software) loaded from the SSD 3 into the memory 102. The host 2 may include a storage device other than the SSD 3. In this case, the host software may be loaded into the memory 102 from another storage device. The host software includes an operating system, a file system, device drivers, application programs, and the like.

The memory 102 is a main memory provided in the host 2. The memory 102 is a volatile semiconductor memory in which the data stored in the memory 102 is lost when the power supply is stopped. The memory 102 is implemented by, for example, a random access memory such as a dynamic random access memory (DRAM).

A portion of a storage area of the memory 102 is used to store one or more submission queue/completion queue pairs (SQ/CQ pairs). Each SQ/CQ pair includes one or more submission queues (SQs) and one completion queue (CQ) associated with the one or more submission queues (SQs).

The submission queue (SQ) is a queue used to issue a request (command) to the SSD 3. The completion queue (CQ) is a queue used to receive a response indicating command completion from the SSD 3.

The host 2 transmits various commands to the SSD 3 via one or more submission queues (SQs) included in each SQ/CQ pair.

The SSD 3 is a semiconductor storage device configured to receive the write request (write command) and the read request (read command) transmitted from the host 2 and executes a data write operation and a data read operation with respect to the non-volatile memory based on the received write command and read command. The non-volatile memory is a semiconductor memory device capable of storing the data stored in the non-volatile memory even after the power supply is stopped. As the non-volatile memory, for example, a NAND flash memory is used.

The SSD 3 can be connected to the host 2. For example, the SSD 3 is built in the information processing device that functions as the host 2. Alternatively, the SSD 3 may be connected to the information processing device via a cable or a network.

As a standard of the logical interface for connecting the host 2 and the SSD 3, for example, Serial Attached SCSI (SAS), Serial ATA (SATA), NVM Express™ (NVMe™) may be used.

The SSD 3 includes a controller 4 and a non-volatile memory (for example, NAND flash memory) 5. The SSD 3 may also include a random access memory such as a DRAM 6.

The controller 4 is a memory controller configured to control the NAND flash memory 5, which is an example of the non-volatile memory. The controller 4 may be implemented by a circuit such as System-on-a-Chip (SoC). The controller 4 is electrically connected to the NAND flash memory 5 via a memory bus called a channel.

The NAND flash memory 5 includes a memory cell array. The memory cell array includes a plurality of memory cells arranged in a matrix. The memory cell array in the NAND flash memory 5 includes a plurality of blocks BLK0 to BLK(x−1). Each of the blocks BLK0 to BLK(x−1) is a unit of a data erasing operation for erasing data. Each of the blocks BLK0 to BLK(x−1) is also referred to as a physical block, a flash block, or a memory block.

Each of the blocks BLK0 to BLK(x−1) includes a plurality of pages (herein, pages P0 to P(y−1)). Each page includes a plurality of memory cells connected to the same word line. Each of pages P0 to P(y−1) is a unit of the data write operation and the data read operation.

The NAND flash memory 5 may include a plurality of the NAND flash memory dies. Each of the NAND flash memory dies may be a flash memory having a two-dimensional structure or a flash memory having a three-dimensional structure.

The DRAM 6 is a volatile semiconductor memory in which the data stored in the DRAM 6 is lost when the power supply is stopped. The DRAM 6 is used, for example, to temporarily store the data which is to be written to the NAND flash memory 5. A storage area of the DRAM 6 is also used to store various management data used by the controller 4.

Next, a detailed configuration of the controller 4 will be described.

The controller 4 includes a host interface (I/F) 11, a CPU 12, a NAND interface (I/F) 13, a DRAM interface (I/F) 14, a direct memory access controller (DMAC) 15, a static RAM (SRAM) 16, and an ECC (Error Correction Code) encode/decode unit 17.

The host interface 11, the CPU 12, the NAND interface 13, the DRAM interface 14, the DMAC 15, the SRAM 16, and the ECC encode/decode unit 17 are interconnected via a bus 10.

The host interface 11 is a host interface circuit configured to execute communication with the host 2. The host interface 11 is, for example, a PCIe controller. Alternatively, when the SSD 3 includes a network interface controller, the host interface 11 may be implemented as a portion of the network interface controller.

The CPU 12 is a processor configured to control the host interface 11, the NAND interface 13, the DRAM interface 14, the DMAC 15, the SRAM 16, and the ECC encode/decode unit 17.

The CPU 12 loads a control program (firmware) into the DRAM 6 from the NAND flash memory 5 or a ROM (not illustrated) in response to the supply of power to the SSD 3.

The NAND interface 13 is a memory control circuit configured to control the NAND flash memory 5 under the control of the CPU 12. Communication between the NAND interface 13 and the NAND flash memory 5 is executed in accordance with, for example, a toggle NAND flash interface or an Open NAND Flash Interface (ONFI).

The DRAM interface 14 is a DRAM control circuit configured to control the DRAM 6 under the control of the CPU 12. A portion of the storage area of the DRAM 6 is used to store a Z2P table (zone-to-physical address translation table) 31 and an L2P table (logical-to-physical address translation table) 32.

The DMAC 15 executes data transmission between the memory 102 of the host 2 and the DRAM 6 (or SRAM 16) under the control of the CPU 12. When the write data is to be transmitted from the memory 102 of the host 2 to an internal buffer 161, the CPU 12 specifies a transmission source address indicating a position in the memory 102 of the host 2, a size of the write data to be transmitted, and a transmission destination address indicating a position in the internal buffer 161 for the DMAC 15. The internal buffer 161 is a storage area for temporarily storing the write data associated with each write request received from the host 2. For example, a portion of the storage area of the SRAM 16 is used as the internal buffer 161. Alternatively, a portion of the storage area of the DRAM 6 may be used as the internal buffer 161 instead of a portion of the storage area of the SRAM 16.

When the data is to be written to the NAND flash memory 5, the ECC encode/decode unit 17 encodes the data to add an error correction code (ECC) to the data as a redundant code. When the data is read from the NAND flash memory 5, the ECC encode/decode unit 17 performs the error correction of the data by using the ECC added to the read data.

Next, the process executed by the CPU 12 will be described. The CPU 12 can function as a flash management unit 21. A portion or the whole of the flash management unit 21 may be implemented by dedicated hardware in the controller 4.

The flash management unit 21 writes the write data to the NAND flash memory 5 based on the write command received from the host 2. The write command is a command (write request) for writing the data (write data) which is to be written to the NAND flash memory 5. As the write command received from the host 2, the write command used in the Zoned Namespace (ZNS) defined by the NVMe standard may be used.

In the case where the controller 4 supports the ZNS, the flash management unit 21 can operate the SSD 3 as a zoned device. In the zoned device, a plurality of zones, to each of which a plurality of logical address ranges obtained by dividing a logical address space for accessing the SSD 3 are assigned, are used as logical storage areas. One of the plurality of physical storage areas in the NAND flash memory 5 is assigned to each of the plurality of zones. Accordingly, the flash management unit 21 can expose each physical storage area in the NAND flash memory 5 to the host 2 as a zone.

The logical address space for accessing the SSD 3 is a continuous logical address used by the host 2 to access the SSD 3. As the logical address, a logical block address (LBA) is used.

In the following, the case where the flash management unit 21 supports the ZNS and a write command used in the ZNS defined by the NVMe standard, that is, a write command specifying the zone, is used as a write command for writing the data to any zone will be mainly described.

The flash management unit 21 manages the plurality of block groups as the plurality of physical storage areas that can be assigned to the plurality of zones. Each of the plurality of block groups may be configured with one block BLK (physical block) among the plurality of blocks BLK provided in the NAND flash memory 5. Alternatively, each of the plurality of block groups may be configured with two or more blocks BLK (physical blocks) among the plurality of blocks BLK provided in the NAND flash memory 5. The flash management unit 21 assigns one of the plurality of block groups as the physical storage area to each of the plurality of zones.

Furthermore, the flash management unit 21 assigns some block groups selected from the plurality of block groups as a shared write buffer. The shared write buffer is a storage area in the NAND flash memory 5 which is shared by the zones set to the first write mode. The shared write buffer is used to temporarily store the write data which is to be written to each zone set to the first write mode.

More specifically, in response to receiving the write request specifying the first zone set to the first write mode from the host 2, the flash management unit 21 writes the write data which is to be written to the first zone to the shared write buffer without writing to the block group assigned to the first zone.

Further, in response to receiving the write request specifying the second zone set to the first write mode from the host 2, the flash management unit 21 writes the write data which is to be written to the second zone to the shared write buffer without writing to the block group assigned to the second zone.

When a total size of the write data which is to be written to the first zone stored in the shared write buffer reaches the capacity of the first zone, the flash management unit 21 copies the write data which is to be written to the first zone stored in the shared write buffer to the block group assigned to the first zone.

Accordingly, it is possible to write data having a size corresponding to the capacity of the first zone to the block group assigned to the first zone. As a result, the block group assigned to the first zone is in a full state where the entire block group is filled with the data.

In this manner, the flash management unit 21 starts writing to the block group assigned to the first zone in a stage where the data having the size corresponding to the capacity of the first zone is prepared in the shared write buffer. Therefore, as compared with the case where the write data is directly written to the block group assigned to the first zone every time the write request specifying the first zone is received, the time required for the block group to be in the full state from the start of the writing to the block group assigned to the first zone can be significantly reduced. Accordingly, it is possible to alleviate the time restriction imposed on the host 2 regarding the writing to the zone.

Similarly, when the total size of the write data which is to be written to the second zone stored in the shared write buffer reaches the capacity of the second zone, the flash management unit 21 copies the write data which is to be written to the second zone stored in the shared write buffer to the block group assigned to the second zone.

Accordingly, it is possible to write data having a size corresponding to the capacity of the second zone to the block group assigned to the second zone. As a result, the block group assigned to the second zone is in a full state where the entire block group is filled with the data.

Therefore, as compared with the case where the write data which is to be written to the second zone is directly written to the block group assigned to the second zone, the time required for the block group to be in the full state from the start of the writing to the block group assigned to the second zone can be significantly reduced.

Figure 2:
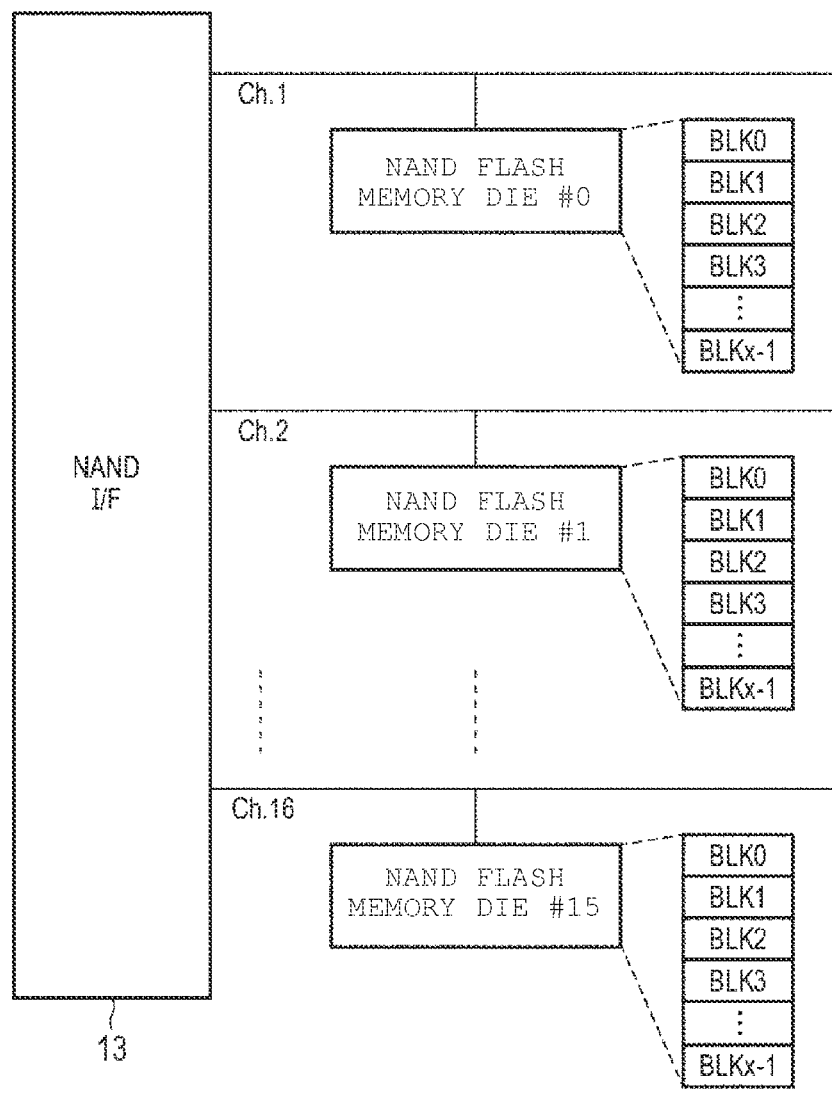
FIG. 2 is a block diagram illustrating an example of a relationship between a plurality of channels and a plurality of the NAND flash memory dies used in the memory system according to at least one embodiment.

Next, the relationship between a plurality of the channels and a plurality of the NAND flash memory dies will be described. FIG. 2 is a block diagram illustrating an example of the relationship between the plurality of channels and the plurality of NAND flash memory dies used in the memory system according to at least one embodiment.

The NAND flash memory 5 includes the plurality of the NAND flash memory dies (also referred to as NAND flash memory chips). The individual NAND flash memory dies can operate independently. For this reason, the NAND flash memory die is treated as a unit capable of operating in parallel.

In FIG. 2, illustrated is a case where sixteen channels Ch. 1 to Ch. 16 are connected to the NAND interface 13 and one NAND flash memory die is connected to each of the sixteen channels Ch. 1 to Ch. 16. In this case, data write/read operations for the sixteen NAND flash memory dies #0 to #15 connected to the channels Ch. 1 to Ch. 16 can be executed in parallel.

Figure 3:
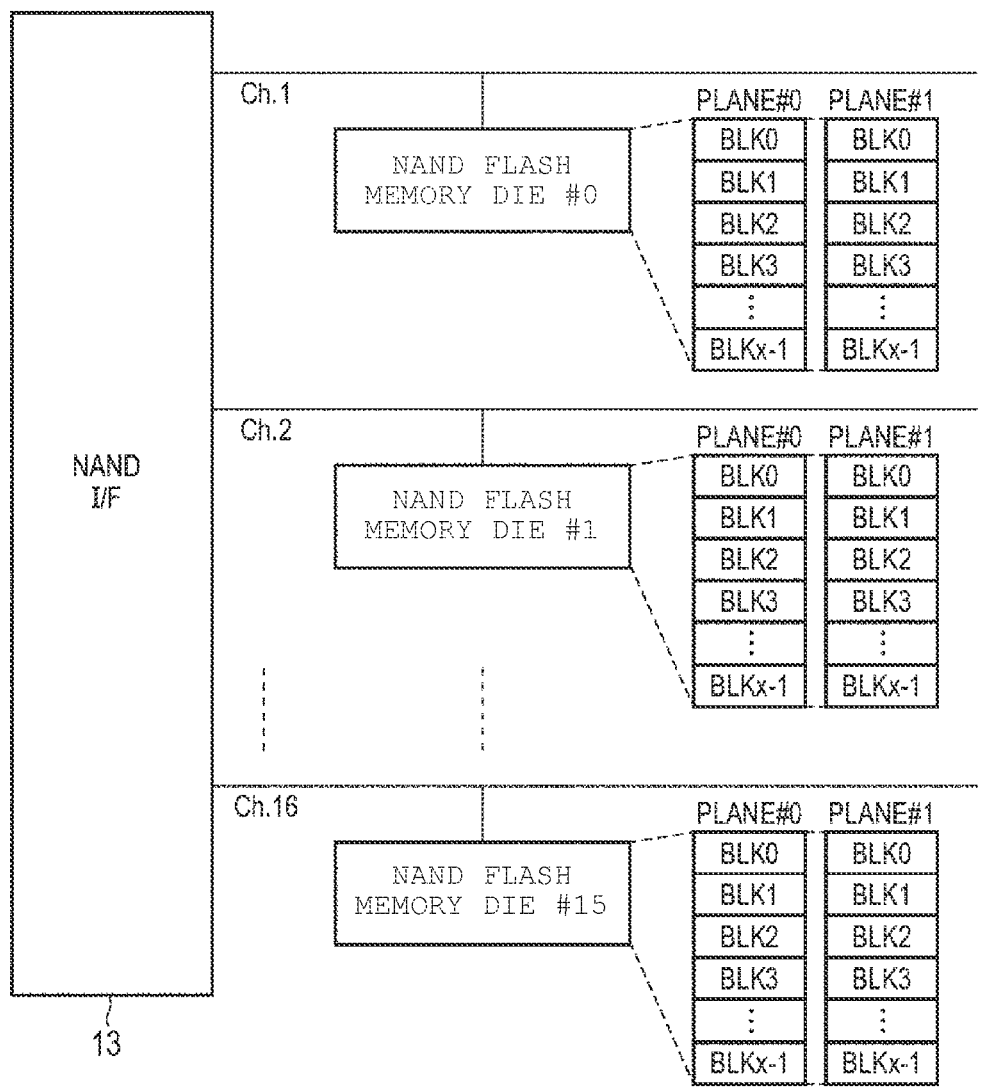
FIG. 3 is a block diagram illustrating another example of the relationship between the plurality of channels and the plurality of the NAND flash memory dies used in the memory system according to at least one embodiment.

It is noted that each of the NAND flash memory dies #0 to #15 may have a multi-plane configuration including a plurality of planes capable of operating in parallel. FIG. 3 is a block diagram illustrating another example of the relationship between the plurality of channels and the plurality of the NAND flash memory dies used in the memory system according to at least one embodiment.

Each plane includes the plurality of blocks (physical blocks). For example, each of the NAND flash memory dies #0 to #15 may have a multi-plane configuration including two planes (PLANE #0 and PLANE #1) as illustrated in FIG. 3. In each of the NAND flash memory dies #0 to #15 illustrated in FIG. 3, a data write/read operation for the first plane (PLANE #0) and a data write/read operation for the second plane (PLANE #1) can be executed in parallel. In the configuration illustrated in FIG. 3, the data write/read operations for 32 planes provided in the NAND flash memory 5 can be executed in parallel.

The controller 4 may construct the plurality of block groups each including one or more blocks (a plurality of physical blocks) from the plurality of dies capable of parallel operation or the plurality of planes capable of parallel operation provided in the NAND flash memory 5. In this case, the controller 4 manages each of a plurality of the constructed block groups as the physical storage area accessible by the host 2 as a zone.

The plurality of block groups (that is, the plurality of physical storage areas) are used so as to allow the host 2 and the controller 4 to jointly manage the data arrangement on the NAND flash memory 5. That is, each of the plurality of block groups may be used as a zone accessible by the host 2. In the following description, each block group is also referred to as a super block.

Figure 4:
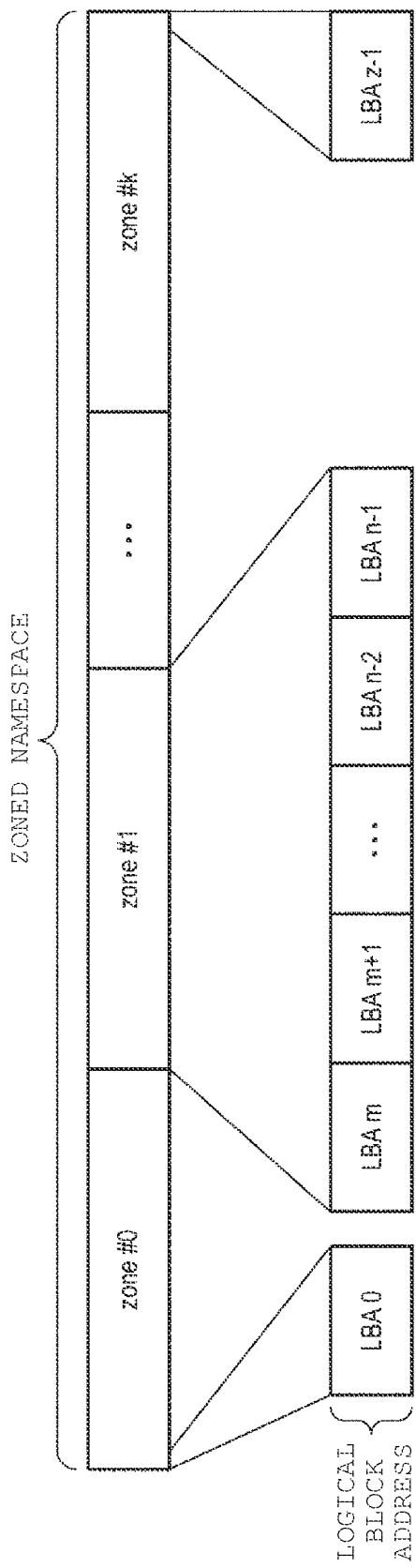
FIG. 4 is a diagram illustrating a configuration example of a zoned namespace defined by an NVMe standard.

Next, the configuration of the plurality of zones will be described. FIG. 4 is a diagram illustrating a configuration example of a zoned namespace defined by the NVMe standard.

The logical block address range of each zoned namespace starts at the LBA0. For example, the logical block address range of the zoned namespace in FIG. 4 includes z consecutive LBAs from LBA0 to LBA(z−1). The zoned namespace is divided into (k+1) zones from the zone #0 to the zone #k. These (k+1) zones include consecutive non-overlapping logical block addresses.

More specifically, the zone #0, the zone #1, . . . , zone #k are assigned to the zoned namespace. The LBA0 indicates the minimum LBA in the zone #0. The LBA(z−1) indicates the maximum LBA in the zone #k. The zone #1 includes LBAm, LBA(m+1), . . . , LBA(n−2), and LBA(n−1). The LBAm indicates the minimum LBA in the zone #1. The LBA(n−1) indicates the maximum LBA in the zone #1.

The controller 4 assigns one of the plurality of block groups as the physical storage area to each of the plurality of zones. Furthermore, the controller 4 manages the mapping between each of the plurality of block groups and each of the plurality of zones by using the Z2P table 31.

For example, when the write command for writing the data to a certain zone is received from the host 2, the controller 4 determines the block group assigned to the zone as the write destination block group and writes the data associated with the received write command to this write destination block group. When the write command for writing the data to another zone is received from the host 2, the controller 4 determines the block group assigned to this other zone as the write destination block group and writes the data associated with the received write command to this write destination block group.

The write command includes, for example, the logical address (start LBA) indicating the first sector in which the write data is to be written, the data size of the write data, and a data pointer (buffer address) indicating the position in the write buffer of the host 2 in which the write data is stored. The write buffer of the host 2 is a storage area provided in the memory 102 of the host 2.

For example, the high-order bit portion of the logical address (start LBA) included in the write command is used as an identifier specifying the zone in which the write data associated with the write command is to be written, that is, the zone start logical block address (ZSLBA) of the zone. Further, the low-order bit portion of the logical address (start LBA) included in the write command is used as a write destination LBA (offset) in the zone to which the write data is to be written.

Therefore, the logical address specified by the write command indicates both one of the plurality of zones and the offset from the beginning of the zone to the write destination position in the zone. It is noted that a zone append command specifying only the ZSLBA may be used as the write command. In this case, the write destination LBA (offset) in the zone is determined by the controller 4 so that the writing in the zone is executed sequentially.

The data size of the write data may be specified by, for example, the number of sectors (logical blocks). One sector corresponds to the minimum data size of the write data that can be specified by the host 2. That is, the data size of the write data is represented by a multiple of sectors.

The value of the next writable LBA in each zone is managed by the write pointer corresponding to each zone.

Figure 5:
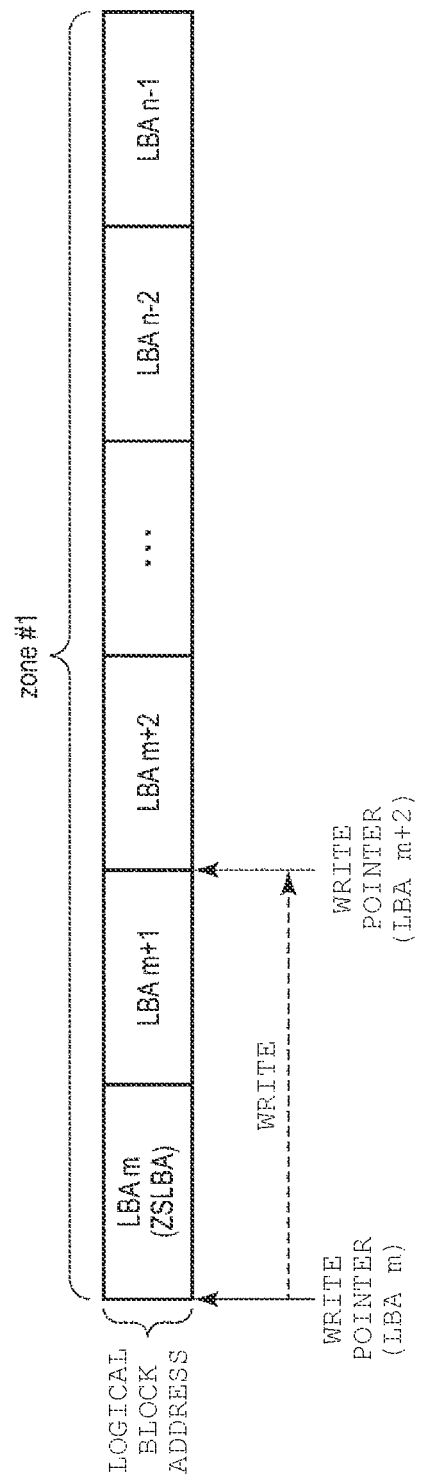
FIG. 5 is a diagram illustrating an update operation of a write pointer, which is executed in the memory system according to at least one embodiment.

Next, the update operation of the write pointer will be described. FIG. 5 is a diagram illustrating the update operation of the write pointer executed in the SSD 3.

The controller 4 manages the plurality of write pointers corresponding to each of the plurality of zones. Each write pointer indicates the next writable LBA in the zone corresponding to that write pointer. When the data is sequentially written to a zone, the controller 4 increases the value of the write pointer corresponding to the zone by the number of logical blocks in which the data is written.

Herein, the update operation of the write pointer will be described by using the zone #1 as an example. The zone #1 includes a logical block address range from LBAm to LBA(n−1). The LBAm is the smallest logical block address of the zone #1, that is, the zone start logical block address (ZSLBA) of the zone #1.

When the zone #1 is in an empty state where no valid data is included, the write pointer corresponding to the zone #1 indicates the LBAm, which is the zone start logical block address of the zone #1. When receiving a command for opening the zone #1 from the host 2, the controller 4 shifts the state of the zone #1 to an opened state where data can be written. In this case, the controller 4 assigns one of the empty state block groups (free block groups) including no valid data as the open state physical storage area associated with the zone #1 and executes the erasing operation on this one block group. Accordingly, writing to the zone #1 becomes possible.

When the write destination position (start LBA) specified by the write command specifying the zone #1 is equal to the write pointer (herein, LBAm) in the zone #1, the controller 4 writes the data to the LBA range starting from the specified start LBA, for example, LBAm and LBA(m+1).

The controller 4 updates the write pointer of the zone #1 so that the value of the write pointer of the zone #1 increases by the number of logical blocks in which data is written. For example, when data are written to the LBAm and the LBA(m+1), the controller 4 updates the value of the write pointer to the LBA(m+2). The LBA(m+2) indicates the smallest LBA among the LBAs in the zone #1 where the data has not yet been written, that is, the next writable LBA in the zone #1.

When rewriting the data to a certain LBA range in the zone #1 to which the data has already been written, it is necessary to reset the zone #1 to return the value of the write pointer to the LBAm, and then to reopen the zone #1.

The commands received by the controller 4 from the host 2 include read commands, open zone commands, close zone commands, reset zone commands, and the like in addition to the write commands.

The read command is a command (read request) for reading data from the NAND flash memory 5. The read command includes the logical address (start LBA) indicating the first sector in which the data (read target data) is to be read, the data size of the read target data, and a data pointer (buffer address) indicating the position in the read buffer of the host 2 to which the read target data is to be transmitted. The read buffer of the host 2 is a storage area provided in the memory 102 of the host 2.

The high-order bit portion of the logical address included in the read command is used as an identifier specifying the zone in which the read target data is stored. The low-order bit portion of the logical address included in the read command specifies an offset in the zone where the read target data is stored.

The open zone command is a command (open request) for shifting one of the plurality of zones, each of which is in an empty state, to an opened state that can be used to write the data. That is, the open zone command is used to shift a particular block group, which is in an empty state where no valid data is included, to an opened state that can be used to write the data.

The open zone command includes a logical address specifying the zone to be shifted to the opened state. For example, the high-order bit portion of the logical address specified by the open zone command is used as an identifier specifying the zone to be shifted to the opened state.

The close zone command is a command (close request) for shifting one of the opened state zones to the closed state where writing is interrupted. The close zone command includes a logical address specifying the zone that is to be shifted to the closed state. For example, the high-order bit portion of the logical address specified by the close zone command is used as an identifier specifying the zone to be shifted to the closed state.

The reset zone command is a command (reset request) for resetting the zone in which rewriting is to be executed and shifting to the empty state. For example, the reset zone command is used to shift a full state zone filled with the data to an empty state where no valid data is included. The valid data denotes data associated with a logical address. The reset zone command includes the logical address specifying the zone which is to be shifted to the empty state. For example, the high-order bit portion of the logical address specified by the reset zone command is used as an identifier specifying the zone which is to be shifted to the empty state. The value of the write pointer corresponding to the zone shifted to the empty state by the reset zone command is set to a value indicating ZSLBA of the zone.

For example, when the zone #1 is reset, the controller 4 can treat the block group assigned as the physical storage area for the zone #1 as a free block group that does not include a valid data. Therefore, this block group can be reused to write the data only by performing the erasing operation on this block group.

Figure 6:
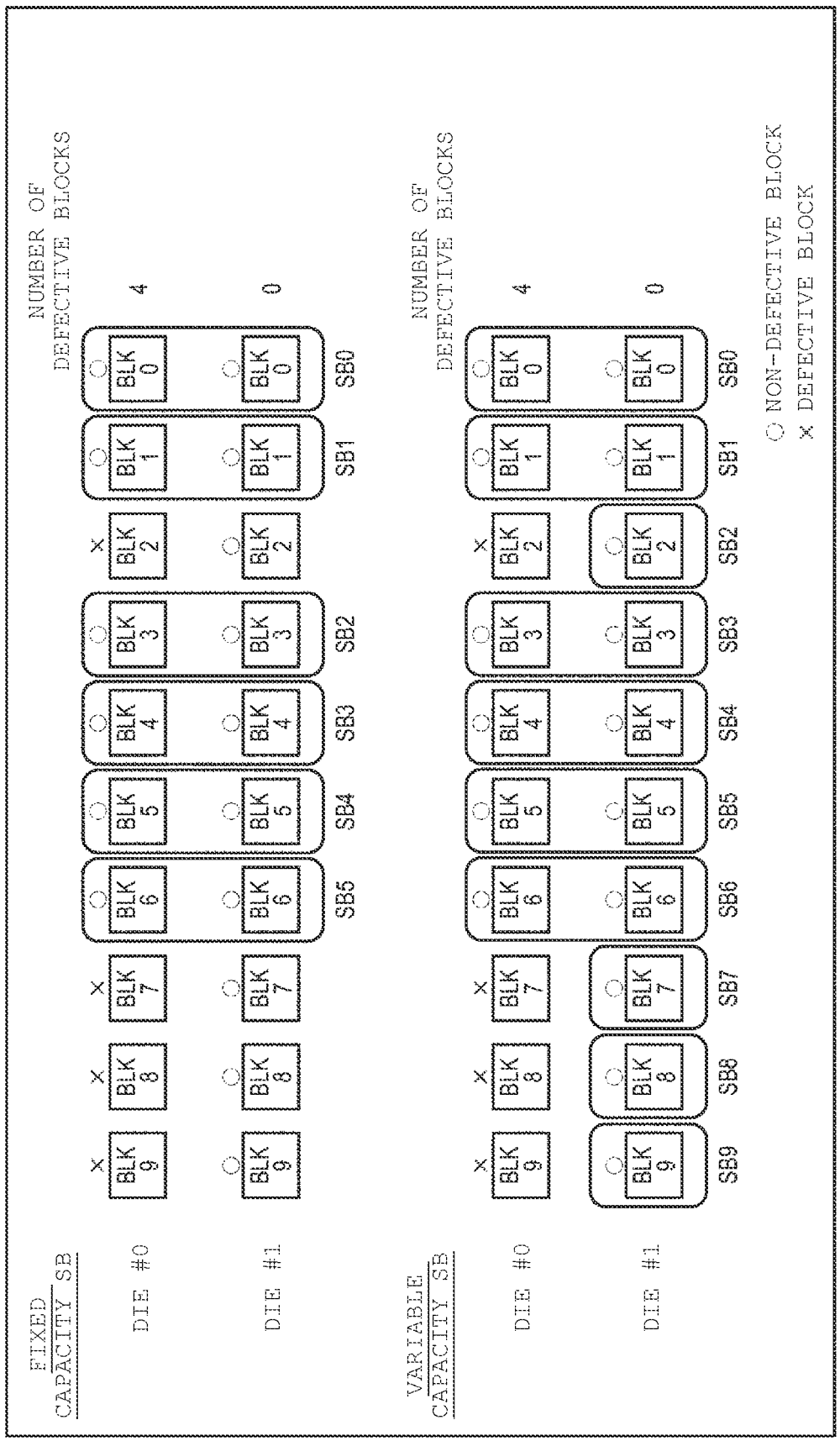
FIG. 6 is a diagram illustrating a first configuration example of a plurality of block groups managed in the memory system according to at least one embodiment.

Next, the structure of the block group will be described. FIG. 6 is a diagram illustrating a first configuration example of the plurality of block groups managed in the SSD 3 according to at least one embodiment.

First, a configuration example of the block group when the capacity of the block group is fixed (fixed capacity super block (SB)) will be described with reference to the upper portion of FIG. 6. Herein, it is assumed that one block group assigned to one zone includes two blocks. As illustrated in the upper portion of FIG. 6, each of the NAND flash memory die #0 and the NAND flash memory die #1 includes ten blocks BLK0 to BLK9. In the NAND flash memory die #0, among the ten blocks BLK0 to BLK9, the four blocks BLK2 and BLK7 to BLK9 are defective blocks. On the other hand, in the NAND flash memory die #1, there are no defective blocks, and all the ten blocks BLK0 to BLK9 are non-defective blocks.

In the fixed capacity SB, each of the plurality of block groups (plurality of super blocks SB) is always constructed with the same capacity. Therefore, the number of super blocks SB that can be constructed is limited to at most the number (herein, six) of non-defective blocks provided in the NAND flash memory die #0.

That is, each of the super blocks SB0 to SB5 is configured with a total of the two non-defective blocks selected one each from the two NAND flash memory dies #0 to #1.

For example, the super block SB0 is configured with the non-defective block BLK0 selected from the NAND flash memory die #0 and the non-defective block BLK0 selected from the NAND flash memory die #1.

The super block SB1 is configured with the non-defective block BLK1 selected from the NAND flash memory die #0 and the non-defective block BLK1 selected from the NAND flash memory die #1.

The super block SB2 is configured with the non-defective block BLK3 selected from the NAND flash memory die #0 and the non-defective block BLK3 selected from the NAND flash memory die #1.

The super block SB3 is configured with the non-defective block BLK4 selected from the NAND flash memory die #0 and the non-defective block BLK4 selected from the NAND flash memory die #1.

The super block SB4 is configured with the non-defective block BLK5 selected from the NAND flash memory die #0 and the non-defective block BLK5 selected from the NAND flash memory die #1.

The super block SB5 is configured with the non-defective block BLK6 selected from the NAND flash memory die #0 and the non-defective block BLK6 selected from the NAND flash memory die #1.

When the six super blocks SB0 to SB5 are constructed, the number of remaining non-defective blocks in the NAND flash memory die #0 becomes zero. For this reason, among the ten non-defective blocks (BLK0 to BLK9) in the NAND flash memory die #1, the four non-defective blocks (herein, BLK2 and BLK7 to BLK9) are not used to construct the super block SB. As a result, the capacity corresponding to the four blocks is wasted.

Next, a configuration example of the block group according to the embodiment when the capacity of the block group is not fixed (variable capacity super block (SB)) will be described with reference to the lower portion of FIG. 6.

Herein, a case where the four super blocks SB are further constructed by using the four non-defective blocks (herein, BLK2 and BLK7 to BLK9 of the NAND flash memory die #1) that were not used in the fixed capacity super block (SB) will be described.

Each of the super blocks SB0, SB1, and SB3 to SB6 is a first type block group having a first capacity. Each of the super blocks SB0, SB1, and SB3 to SB6 is configured with a total of the two non-defective blocks selected one each from the two NAND flash memory dies #0 to #1.

For example, the super block SB0 is configured with the non-defective block BLK0 selected from the NAND flash memory die #0 and the non-defective block BLK0 selected from the NAND flash memory die #1.

The super block SB1 is configured with the non-defective block BLK1 selected from the NAND flash memory die #0 and the non-defective block BLK1 selected from the NAND flash memory die #1.

The super block SB3 is configured with the non-defective block BLK3 selected from the NAND flash memory die #0 and the non-defective block BLK3 selected from the NAND flash memory die #1.

The super block SB4 is configured with the non-defective block BLK4 selected from the NAND flash memory die #0 and the non-defective block BLK4 selected from the NAND flash memory die #1.

The super block SB5 is configured with the non-defective block BLK5 selected from the NAND flash memory die #0 and the non-defective block BLK5 selected from the NAND flash memory die #1.

The super block SB6 is configured with the non-defective block BLK6 selected from the NAND flash memory die #0 and the non-defective block BLK6 selected from the NAND flash memory die #1.

Each of the super blocks SB2 and SB7 to SB9 is a second type block group having a second capacity. Each of the super blocks SB2 and SB7 to SB9 is configured with a total of one non-defective block selected from the NAND flash memory die #1 having a small number of defective blocks. Each of the super blocks SB6 to SB7 does not include the non-defective blocks in the NAND flash memory die #0 having a large number of defective blocks.

Even when there is a large deviation in the number of defective blocks between the NAND flash memory die #0 and the NAND flash memory die #1, by using a variable capacity block group, all (or almost all) of the non-defective blocks provided in the NAND flash memory die #1 having small number of defective blocks can be used to construct the super block SB.

However, in this case, the capacity of each of these four super blocks SB becomes a half of the capacity of each of the other super blocks SB. As a result, the capacity of the zone to which these four super blocks SB are assigned becomes a value different from the capacity of the zone to which the other super blocks SB are assigned.

Figure 7:
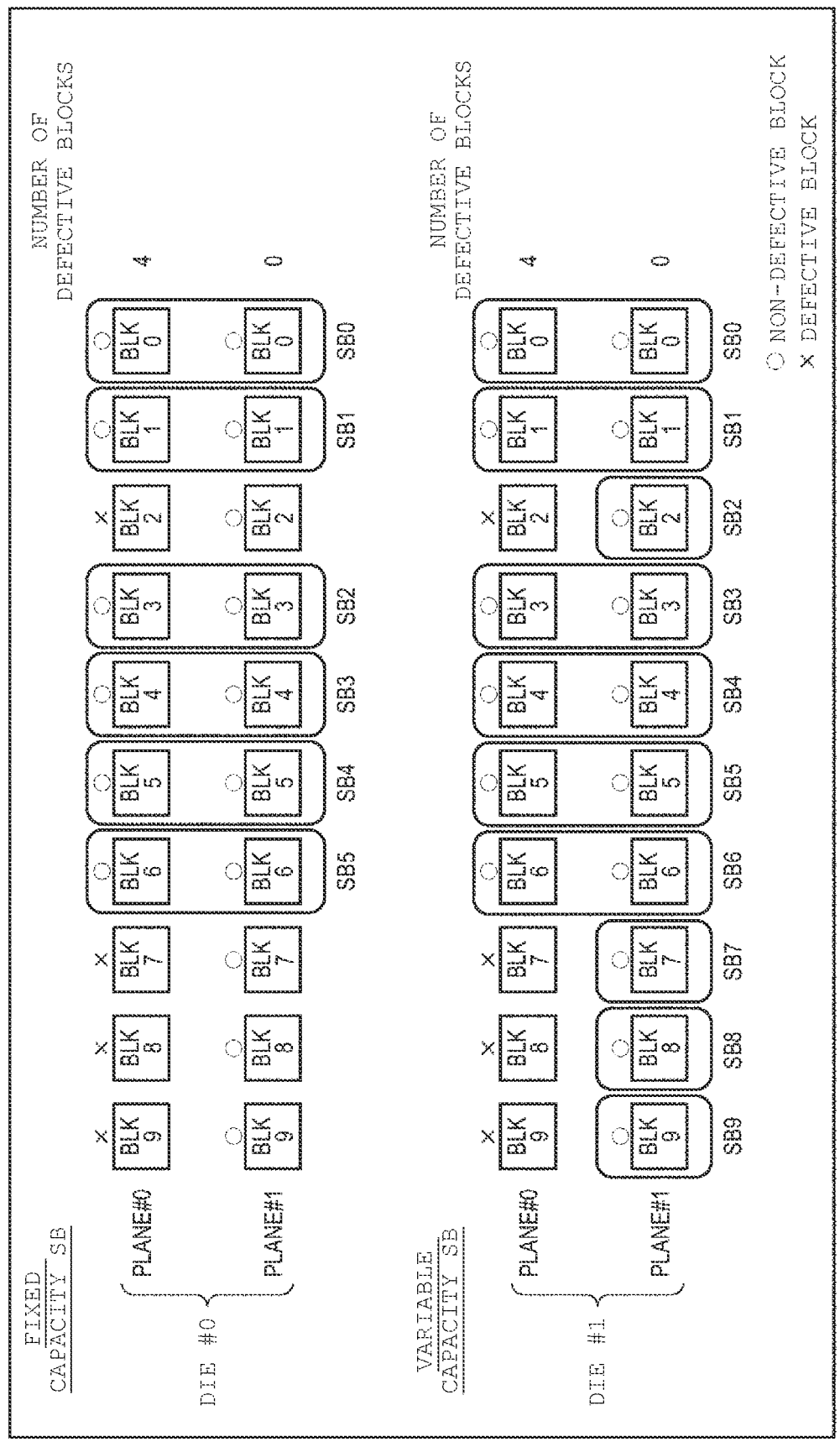
FIG. 7 is a diagram illustrating a second configuration example of the plurality of block groups managed in the memory system according to at least one embodiment.

FIG. 7 is a diagram illustrating a second configuration example of the plurality of block groups managed in the SSD 3 according to at least one embodiment.

First, a configuration example of the block group in the case of a fixed capacity SB will be described with reference to the upper portion of FIG. 7. Herein, it is assumed that the NAND flash memory die #0 includes two planes, and one block group assigned to one zone includes two blocks. As illustrated in the upper portion of FIG. 7, each of the first plane (PLANE #0) and the second plane (PLANE #1) in the NAND flash memory die #0 includes ten blocks BLK0 to BLK9. In the first plane (PLANE #0), among the ten blocks BLK0 to BLK9, the four blocks BLK2 and BLK7 to BLK9 are defective blocks. On the other hand, in the second plane (PLANE #1), there are no defective blocks, and all the ten blocks BLK0 to BLK9 are non-defective blocks.

In the fixed capacity SB, each of the plurality of block groups (plurality of super blocks SB) is always constructed with the same capacity. Therefore, the number of super blocks SB that can be constructed is limited to at most the number (herein, six) of non-defective blocks provided in the first plane (PLANE #0).

That is, each of the super blocks SB0 to SB5 is configured with a total of the two non-defective blocks selected one each from the two planes (PLANE #0 to PLANE #1). For example, the super block SB0 is configured with the non-defective block BLK0 selected from the first plane (PLANE #0) and the non-defective block BLK0 selected from the second plane (PLANE #1). The super block SB1 is configured with the non-defective block BLK1 selected from the first plane (PLANE #0) and the non-defective block BLK1 selected from the second plane (PLANE #1). The super block SB2 is configured with the non-defective block BLK3 selected from the first plane (PLANE #0) and the non-defective block BLK3 selected from the second plane (PLANE #1). The super block SB3 is configured with the non-defective block BLK4 selected from the first plane (PLANE #0) and the non-defective block BLK4 selected from the second plane (PLANE #1). The super block SB4 is configured with the non-defective block BLK5 selected from the first plane (PLANE #0) and the non-defective block BLK5 selected from the second plane (PLANE #1). The super block SB5 is configured with the non-defective block BLK6 selected from the first plane (PLANE #0) and the non-defective block BLK6 selected from the second plane (PLANE #1).

When six super blocks SB0 to SB5 are constructed, the number of remaining non-defective blocks in the first plane (PLANE #0) becomes zero. Therefore, among the ten non-defective blocks (BLK0 to BLK9) in the second plane (PLANE #1), the four non-defective blocks (herein, BLK2 and BLK7 to BLK9) are not used to construct the super block SB. As a result, the capacity corresponding to the four blocks is wasted.

Next, a configuration example of the block group in the case of the variable capacity SB will be described with reference to the lower portion of FIG. 7. In the variable capacity SB, the ten block groups (super blocks SB0 to SB9) are constructed by constructing not only the block group having a first capacity but also the block group having a second capacity smaller than the first capacity.

Each of the super blocks SB0, SB1, and SB3 to SB6 is a first type block group having a first capacity. Each of the super blocks SB0, SB1, and SB3 to SB6 is configured with a total of the two non-defective blocks selected one each from the first plane (PLANE #0) and the second plane (PLANE #1).

For example, the super block SB0 is configured with the non-defective block BLK0 selected from the first plane (PLANE #0) and the non-defective block BLK0 selected from the second plane (PLANE #1). The super block SB1 is configured with the non-defective block BLK1 selected from the first plane (PLANE #0) and the non-defective block BLK1 selected from the second plane (PLANE #1). The super block SB3 is configured with the non-defective block BLK3 selected from the first plane (PLANE #0) and the non-defective block BLK3 selected from the second plane (PLANE #1). The super block SB4 is configured with the non-defective block BLK4 selected from the first plane (PLANE #0) and the non-defective block BLK4 selected from the second plane (PLANE #1). The super block SB5 is configured with the non-defective block BLK5 selected from the first plane (PLANE #0) and the non-defective block BLK5 selected from the second plane (PLANE #1). The super block SB6 is configured with the non-defective block BLK6 selected from the first plane (PLANE #0) and the non-defective block BLK6 selected from the second plane (PLANE #1).

Each of the super blocks SB2 and SB7 to SB9 is a second type block group having a second capacity. Each of the super blocks SB2 and SB7 to SB9 is configured with a total of the two non-defective blocks selected from the second plane (PLANE #1) having a small number of defective blocks. Each of the super blocks SB2 and SB7 to SB9 does not include the non-defective blocks in the first plane (PLANE #0) having a large number of defective blocks.

In this manner, even when there is a large deviation in the number of defective blocks between the first plane (PLANE #0) and the second plane (PLANE #1), by constructing the super block with not only the block group having the plurality of first capacities but also the block group having the second capacity, all (or almost all) of the non-defective blocks provided in the second plane (PLANE #1) having small number of defective blocks can be used to construct the super block SB.

It is noted that, although the two types of super blocks SB that are the first type and the second type are described herein, three or more types of super blocks SB having different capacities may be used.

The controller 4 assigns each of the plurality of super blocks managed by the controller 4 to each of the plurality of zones. Then, the controller 4 manages the correspondence relationship between each of the plurality of zones and the plurality of super blocks by the Z2P table 31.

FIG. 8 is a diagram illustrating a configuration example of the Z2P table 31 which is a management table for managing the correspondence relationship between each of the plurality of zones and each of the plurality of block groups used in the memory system according to at least one embodiment.

The Z2P table 31 has a plurality of entries corresponding to each of a plurality of zones provided in any zoned namespace. In FIG. 8, the Z2P table 31 has (k+1) entries for managing (k+1) zones.

In each of the plurality of entries, an identifier (SB identifier) indicating the super block SB assigned to the zone corresponding to the entry is stored as the physical address PBA of the physical storage area corresponding to the zone. In FIG. 8, the entry corresponding to the zone #0 stores an SB identifier indicating the super block SB assigned to the zone #0. Further, the entry corresponding to the zone #1 stores an SB identifier indicating the super block SB assigned to the zone #1. Furthermore, the entry corresponding to the zone #k stores an SB identifier indicating the super block SB assigned to the zone #1.

In FIG. 8, although the Z2P table 31 corresponding to a certain zoned namespace is illustrated, the Z2P table 31 may include an entry corresponding to each of the plurality of zones provided in the plurality of zoned namespaces.

In this manner, in the SSD 3 conforming to the zoned namespace, the write data is written to the super block assigned to the zone specified by the write command received from the host 2. When the SSD 3 is used as a storage device for a server computer, for example, a plurality of zones corresponding to a plurality of applications (or a plurality of clients) may be simultaneously used so that a plurality of types of data are written to different zones. In this case, the time for the entire zone to be in the full state of being filled with the data from the start of writing to the zone may vary for each zone.

Generally, in a non-volatile memory such as a NAND flash memory, it is required to complete writing to all pages in the block within the time limit (also referred to as the write time limit) after the erasing operation on a certain block is executed.

Therefore, in some cases, when the time required for a certain zone to be in the full state from the start of writing to the zone is too long, the reliability of the block group of the NAND flash memory 5 used as the zone may not be guaranteed.

However, in the case where different zones are used for writing by different applications (or different clients) as described above, when the frequency of the data writing from one application (or one client) is low or when the amount of the data writing from one application (or one client) is small, a write speed to the zone used by the application may be low.

In this case, the block group may be forcibly put into a full state by writing the dummy data to the entire unwritten area of the block group assigned to the zone. However, when the operation is performed in this manner, the host 2 cannot write the data corresponding to the capacity of the zone to the zone. As a result, there is a discrepancy between the capacity of the zone recognized by the host 2 and the capacity actually writable by the host 2 in the zone, and thus, there is a possibility that the operation of the host 2 may be affected.

Therefore, in the embodiment, the controller 4 implements the first write mode of writing the write data which is to be written to each zone to the super block assigned to the shared write buffer instead of controlling the writing to the zone in the normal mode of writing the write data which is to be written to a certain zone to the super block assigned to the zone. Hereinafter, this first write mode is referred to as a Long Access Limit Mode (LALM).

Figure 9:
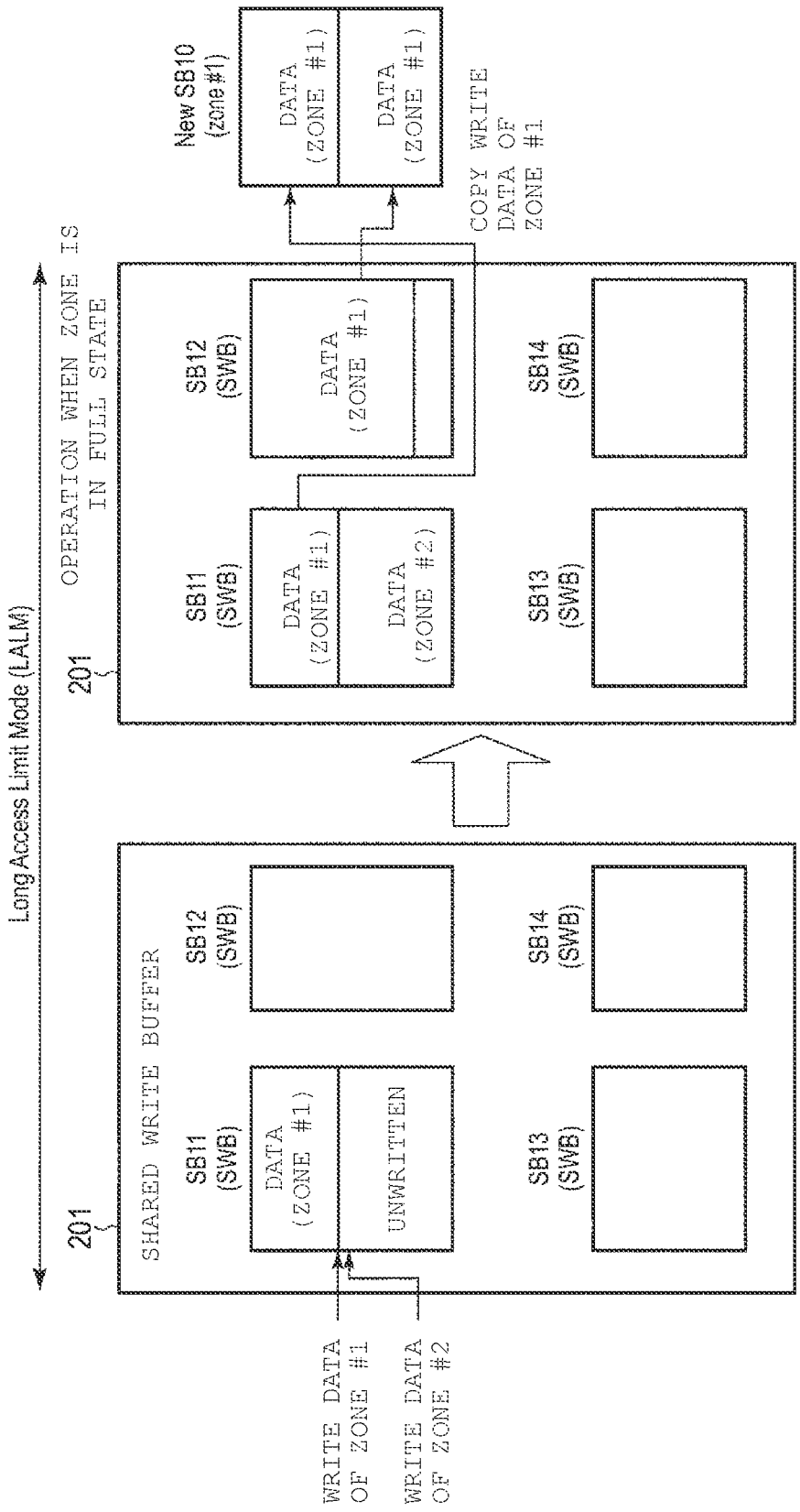
FIG. 9 is a diagram illustrating an operation of controlling a first zone and a second zone by a Long Access Limit Mode (LALM), which is executed in the memory system according to at least one embodiment.

Next, the LALM will be described in detail. FIG. 9 is a diagram illustrating an operation of controlling the first zone and the second zone by the Long Access Limit Mode (LALM), which is executed in the SSD 3 according to the embodiment.

Herein, the write mode of each of the zone #1 and the zone #2 is set to the LALM. Further, four super blocks SB11 to SB14 are assigned to the shared write buffer (SWB) 201.

The controller 4 writes the write data (zone #1) to the write destination super block SB11 of the shared write buffer 201 in response to receiving the write command specifying the zone #1 set to the LALM from the host 2. The write data (zone #1) is the write data associated with the write command specifying the zone #1, that is, the write data which is to be written to the zone #1.

Further, the controller 4 writes the write data (zone #2) to the write destination super block SB11 of the shared write buffer 201 in response to receiving the write command specifying the zone #2 set to the LALM from the host 2. The write data (zone #2) is the write data associated with the write command specifying the zone #2, that is, the write data which is to be written to the zone #2.

When the super block SB11 assigned as the write destination super block in the shared write buffer 201 goes into a full state with no unwritten area, the controller 4 assigns the super block SB12 in the shared write buffer 201 as a new write destination super block. When there is no super block that can be assigned as a new write destination super block in the shared write buffer 201, the controller 4 may assign any free super block that does not include a valid data as a new write destination super block in the shared write buffer 201.

In FIG. 9, the write data which are to be written to the zone #1 and the zone #2, respectively, are stored in the super block SB11 in the shared write buffer 201, and the write data which is to be written to the zone #1 is stored in the super block SB12.

The controller 4 determines whether the total size of the write data which is to be written to the zone #1 stored in the shared write buffer 201 (herein, the super blocks SB11 to SB12) reaches the capacity of the zone #1. The capacity of the zone #1 corresponds to the number of LBAs actually writable to the zone #1, that is, the capacity of the super block assigned to the zone #1.

When the total size of the write data which is to be written to the zone #1 stored in the shared write buffer 201 reaches the capacity of the zone #1, the controller 4 copies the write data which is to be written to the zone #1 stored in the shared write buffer 201 to the super block SB10 newly assigned to the zone #1.

Specifically, the controller 4 copies the write data (zone #1) stored in the super block SB11 and the write data (zone #1) stored in the super block SB12 to the super block SB10.

The controller 4 can set the super block SB10 to a writable state by executing the erasing operation on the super block SB10 newly assigned to the zone #1 immediately before the copy operation. Then, the controller 4 writes the write data (zone #1) stored in the super block SB11 and the write data (zone #1) stored in the super block SB12 to the super block SB10. Therefore, the writing time required for the super block SB12 to be in the full state from the start of writing to the super block SB12 becomes a value that does not depend on the write speed of the zone #1.

When a certain zone is in the normal mode, the write data which is to be written to the zone is sequentially written to the super block SB assigned to the zone. Therefore, it is not necessary to manage the mapping between the LBA and the physical address on a sector-by-sector basis. On the other hand, when the write mode of some zones is set to the LALM, the write data which is to be written to these zones is written to the write destination super block in the shared write buffer 201. Therefore, in the shared write buffer 201, the write data of different zones is mixed in the write destination super block herein.

Therefore, the controller 4 needs to manage the physical storage area in the shared write buffer 201 in which each of the write data which is to be written to the zone set to the LALM is stored. For this reason, in at least one embodiment, the controller 4 manages the mapping between the LBA and the physical address for each zone set to the LALM by using the L2P table 32.

Figure 10:
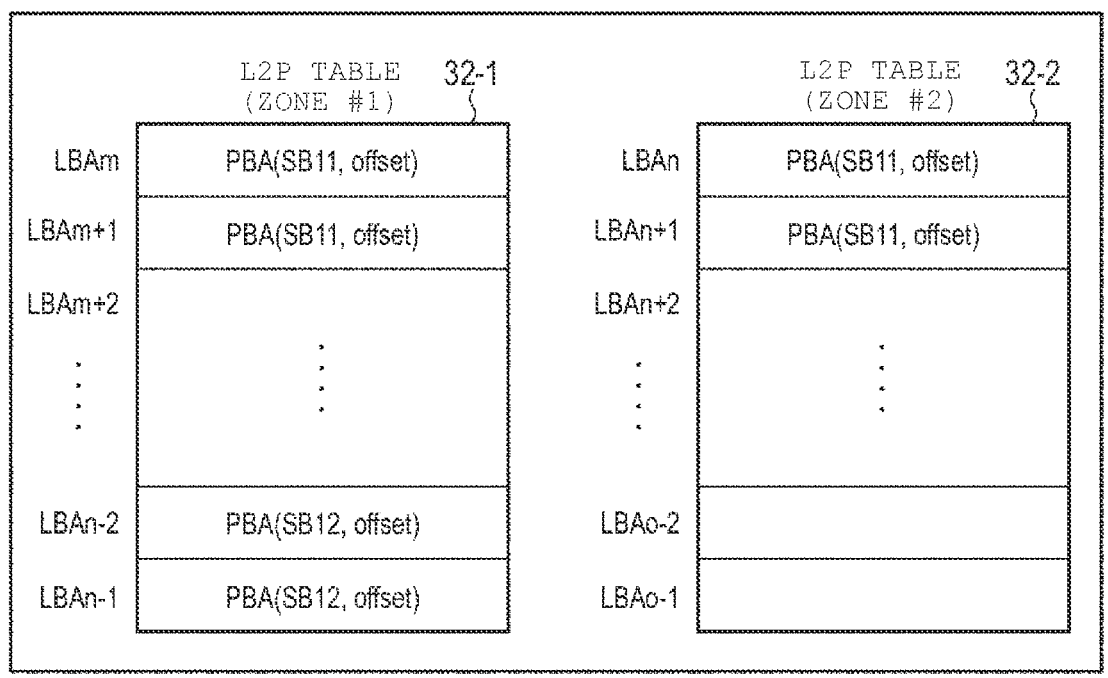
FIG. 10 is a diagram illustrating a configuration example of a logical physical address translation table for managing mapping between each logical address and each physical address in a shared write buffer, which is used in the memory system according to at least one embodiment.

FIG. 10 is a diagram illustrating a configuration example of the L2P table 32, which is a logical physical address translation table for managing the mapping between each logical address and each physical address in the shared write buffer 201, which is used in the SSD 3 according to at least one embodiment.

FIG. 10 illustrates L2P tables 32-1 and 32-2 corresponding to the zone #1 and the zone #2, respectively, in the state where the zone #1 in FIG. 9 is in the full state. Herein, the LBA range of LBAm to LBA(n−1) is set in the zone #1, and the LBA range of LBAn to LBA(o−1) is set in the zone #2.

The L2P table 32 includes the plurality of entries corresponding to the plurality of LBAs. In each of the plurality of entries, an identifier (SB identifier) indicating a super block in which the data associated with the LBA corresponding to this entry is stored and an offset indicating a position in this super block in which the data is stored are stored as the physical address (PBA) of the physical storage area in which the data is stored. For this reason, the controller 4 can identify the physical storage area in the shared write buffer 201 in which the write data associated with the LBA corresponding to each entry is stored with reference to the L2P table 32.

Specifically, since the write data associated with the LBA (LBAm) at the beginning of the zone #1 is stored in the storage position in the super block SB11, the SB identifier indicating the super block SB11 and the offset from the beginning of the super block SB11 to the storage position are stored in the entry corresponding to the LBAm in the L2P table 32-1.

Further, since the write data associated with the LBA (LBA(n−1)) at the end of the zone #1 is stored in the storage position in the super block SB12, the SB identifier indicating the super block SB12 and the offset from the beginning of the super block SB12 to the storage position are stored in the entry corresponding to the LBA(n−1) in the L2P table 32-1.

Then, since the write data associated with the LBA (LBAn) at the beginning of the zone #2 is stored in the storage position in the super block SB11, the SB identifier indicating the super block SB11 and the offset from the beginning of the super block SB11 to the storage position are stored in the entry corresponding to the LBAn in the L2P table 32-2.

As described above, the SSD 3 can provide the host 2 with the convenience as when the time limit from the start of writing to the zone (that is, the super block SB) to the completion of writing disappears by implementing the LALM.

The controller 4 does not necessarily need to set all the zones to the LALM and may set only some zones having a low write speed to the LALM.

For example, when the host 2 specifies that some zones have a write speed lower than the threshold value for the zones, the controller 4 sets the zones to the LALM. The zones where the write speed is lower than the threshold value are also referred to as slow write zones.

For each zone other than the zone set to the LALM, the controller 4 controls the writing to each zone in the normal mode (second write mode). In this case, every time the write request specifying a zone set to the second write mode is received, the controller 4 writes the write data to the super block SB assigned to the specified zone without writing the write data to the shared write buffer 201.

In this manner, the write amplification due to data copy can be reduced by setting only zones specified as the slow write zone by the host 2 to the LALM, as compared with the case where all zones are set to the LALM.

Further, the controller 4 may use a method of setting the zone satisfying the condition among the zones set to the second write mode (normal mode) to the first write mode (LALM).

In this case, the controller 4 sets, for example, all other zones except the zone specified as the slow write zone by the host 2 to the normal mode in advance. In response to receiving a write command specifying the zone set to the normal mode from the host 2, the controller 4 writes the write data which is to be written to the zone to the super block SB assigned to the zone. When some zones among the zones set to the normal mode satisfy the shift condition to the LALM, the controller 4 sets the write mode of these zones to the LALM.

Figure 11:
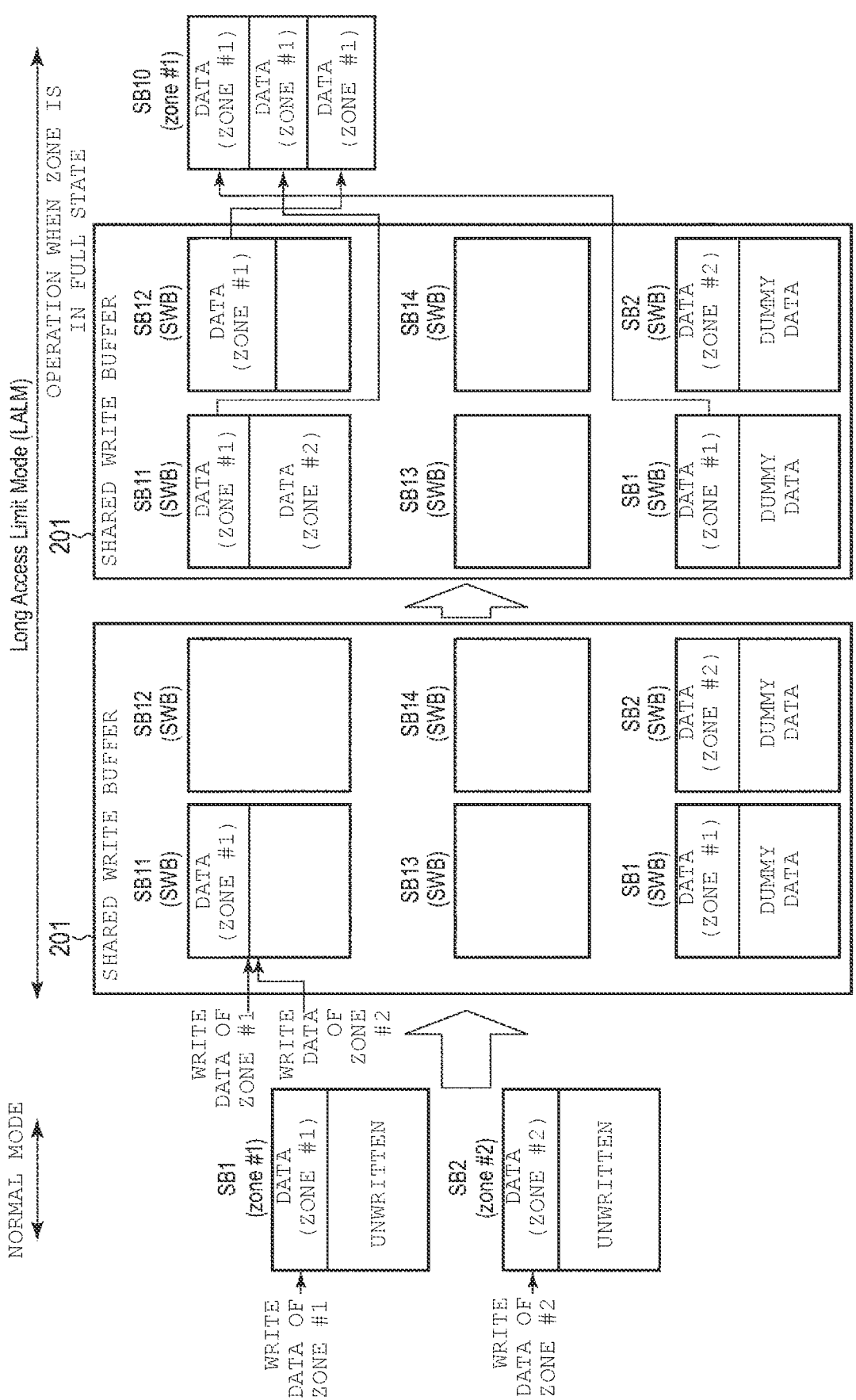
FIG. 11 is a diagram illustrating (1) an operation of controlling the first zone and the second zone in a normal mode, (2) an operation of setting the first zone and the second zone to the LALM, writing a dummy data to each of an unwritten area of the block group assigned to the first zone and an unwritten area of the block group assigned to the second zone, and writing the subsequent write data of the first zone and the subsequent write data of the second zone to the shared write buffer, and (3) an operation of copying the write data of the first zone in the shared write buffer to the new block group assigned to the first zone, which are executed in the memory system according to at least one embodiment.

Next, the first method of setting the zone satisfying the shift condition among the zones set to the normal mode to the LALM will be described. FIG. 11 is a diagram illustrating (1) an operation of controlling the first zone and the second zone in a normal mode, (2) an operation of setting the first zone and the second zone to the LALM, writing the dummy data to each of the unwritten area of the block group assigned to the first zone and the unwritten area of the block group assigned to the second zone, and writing the subsequent write data of the first zone and the subsequent write data of the second zone to the shared write buffer, and (3) an operation of copying the write data of the first zone in the shared write buffer to the new block group assigned to the first zone, which are executed in the SSD 3 according to at least one embodiment.

First, the zone #1 and the zone #2 are set to the normal mode, and the zones are assigned with the super block SB1 and the super block SB2, respectively. When the state of the zone #1 is shifted to the opened state where the data can be written, the erasing operation on the super block SB1 is executed. Accordingly, writing to the super block SB1 becomes possible. Similarly, when the state of the zone #2 is shifted to the opened state where the data can be written, the erasing operation on the super block SB2 is executed. Accordingly, the writing to the super block SB2 becomes possible.

The controller 4 controls the writing to the zone #1 in the normal mode until a first time elapses from the shift of the zone #1 to the opened state. Similarly, the controller 4 controls the writing to the zone #2 in the normal mode until the second time elapses from the shift of the zone #2 to the opened state.

The controller 4 writes the write data (zone #1) which is to be written to the zone #1 to the super block SB1 in response to receiving the write command specifying the zone #1 set to the normal mode from the host 2. Further, the controller 4 writes the write data (zone #2) which is to be written to the zone #2 to the super block SB2 in response to receiving the write command specifying the zone #2 set to the normal mode from the host 2.

After that, when the first time elapses from the shift to the opened state of the zone #1 in the state where the unwritten area having the first size or larger remains in the super block SB1, the controller 4 shifts the write mode of the zone #1 from the normal mode to the LALM.

Herein, the first time may have a value (for example, a time corresponding to 99% of the time limit) close to the time limit indicating the time when the super block SB is allowed to be in the full state from the execution of the erasing operation on each super block SB. Further, the first size may be a small value close to 0.

In this case, first, the controller 4 sets the zone #1 to the LALM. Then, the controller 4 writes the dummy data generated by the controller 4 to the unwritten area of the super block SB1. Accordingly, the super block SB1 is set to the full state where the entire super block SB1 is filled with the data. Then, the controller 4 manages the super block SB1 as a super block assigned to the shared write buffer 201.

Further, when the first time elapses from the shift to the opened state of the zone #2 in the state where the unwritten area having the first size or larger remains in the super block SB2, the controller 4 shifts the write mode of the zone #2 from the normal mode to the LALM.

In this case, first, the controller 4 sets the zone #2 to the LALM. Then, the controller 4 writes the dummy data generated by the controller 4 to the unwritten area of the super block SB2. Accordingly, the super block SB2 is set to the full state where the entire super block SB2 is filled with the data. Then, the controller 4 manages the super block SB2 as a super block assigned to the shared write buffer 201.

The controller 4 writes the write data (zone #1) which is to be written to the zone #1 to the write destination super block (herein, super block SB11) of the shared write buffer 201 in response to receiving the write command specifying the zone #1 set to the LALM from the host 2. At this time, the controller 4 updates the L2P table 32-1 corresponding to the zone #1 so that the physical address PBA indicating the position in the shared write buffer 201 to which the write data (zone #1) is written is associated with the LBA of the write data (zone #1).

The controller 4 writes the write data (zone #2) which is to be written to the zone #2 to the write destination super block (herein, the super block SB11) of the shared write buffer 201 in response to receiving the write command specifying the zone #2 set to the LALM from the host 2. The controller 4 updates the L2P table 32-2 corresponding to the zone #2 so that the physical address PBA indicating the position in the shared write buffer 201 to which the write data (zone #2) is written is associated with the LBA of the write data (zone #2).

When the super block SB11 assigned to the write destination block in the shared write buffer 201 goes into a full state with no unwritten area, the controller 4 newly assigns the super block SB12 in the shared write buffer 201 as the write destination super block.

In response to receiving a write command specifying the zone #1 set to the LALM from the host 2, the controller 4 writes the write data (zone #1) which is to be written to the zone #1 to the new write destination super block (herein, the super block SB12) of the shared write buffer 201. The new write destination super block of the shared write buffer 201 is used as not only the write destination of the write data which is to be written to the zone #1 but also the write destination of the write data which is to be written to the zone #2 set to the LALM. That is, when the write command specifying the zone #2 set to the LALM is received from the host 2, the controller 4 writes the write data (zone #2) which is to be written to the zone #2 to the new write destination super block (herein, the super block SB12) of the shared write buffer 201.

The controller 4 determines whether the total size of the write data which is to be written to the zone #1 stored in the shared write buffer 201 (herein, the super blocks SB1, SB11, and SB12) reaches the capacity of the zone #1.

When the total size of the write data which is to be written to the zone #1 stored in the shared write buffer 201 reaches the capacity of the zone #1, the controller 4 copies the write data to be written to the zone #1 stored in the shared write buffer 201 to the super block SB10 newly assigned to the zone #1.

Specifically, the controller 4 copies the write data (zone #1) stored in the super block SB1, the write data (zone #1) stored in the super block SB11, and the write data (zone #1) stored in the super block SB12 to the super block SB10. Then, the controller 4 updates the Z2P table 31 so that the super block associated with the zone #1 is changed from the super block SB1 to the super block SB10.

When the write data (zone #1) having a size corresponding to the capacity of the zone #1 is copied from the shared write buffer 201 to the super block SB10, the write data (zone #1) stored in the super block SB1, the write data (zone #1) stored in the super block SB11, and the write data (zone #1) stored in the super block SB12 become invalid data.

In this manner, when the first time elapses from the shift to the opened state of the zone #1 in the state where the unwritten area having the first size or larger remains in the super block SB1, the dummy data is added as padding to the unwritten area of the super block SB1. Therefore, even when the zone #1 is a slow write zone, the super block SB1 can be reliably set to the full state within the time limit.

In addition, after the zone #1 is set to the LALM, the write data to the zone #1 is written to the shared write buffer 201 not to the super block SB1. Therefore, even after the entire unwritten area of the super block SB1 is filled with the dummy data, the host 2 can continue to execute the writing to the zone #1. Therefore, there is no discrepancy between the capacity of the zone #1 recognized by the host 2 and the capacity actually writable by the host 2 in this zone #1.

Further, when the first time elapses from the shift to the opened state of the zone #1 in the state where the unwritten area having the first size or larger does not remain in the super block SB1, the controller 4 maintains the write mode of the zone #1 in the normal mode. Therefore, the shifting only the zone satisfying the shift condition to the LALM becomes possible.

When the total size of the write data which is to be written to the zone #2 stored in the shared write buffer 201 reaches the capacity of the zone #2, the controller 4 copies the write data which is to be written to the zone #2 stored in the shared write buffer 201 to the super block SB (not illustrated) newly assigned to the zone #2. Then, the controller 4 updates the Z2P table 31 so that the super block associated with the zone

2 is changed from the super block SB2 to the super block SB newly assigned to the zone #2.

Figure 12:
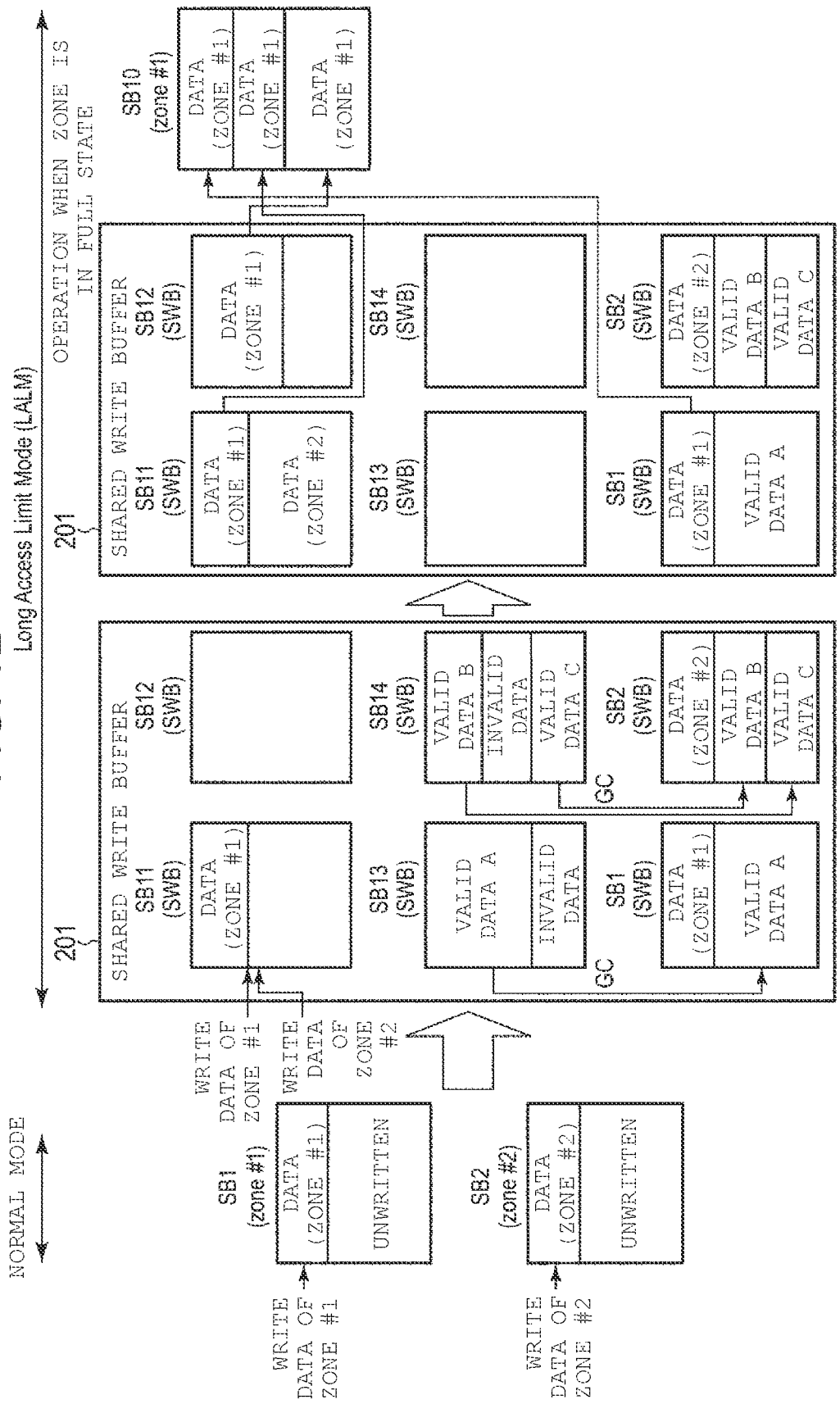
FIG. 12 is a diagram illustrating (1) an operation of controlling the first zone and the second zone in a normal mode, (2) an operation of setting the first zone and the second zone to the LALM, copying a valid data of other zones stored in a garbage collection source block group in the shared write buffer to each of the unwritten area of the block group assigned to the first zone and the unwritten area of the block group assigned to the second zone, and writing the subsequent write data of the first zone and the subsequent write data of the second zone to the shared write buffer, and (3) an operation of copying the write data of the first zone in the shared write buffer to the new block group assigned to the first zone, which are executed in the memory system according to at least one embodiment.

Next, a second method of setting the zone satisfying the shift condition among the zones set to the normal mode to the LALM will be described. FIG. 12 is a diagram illustrating (1) an operation of controlling the first zone and the second zone in a normal mode, (2) an operation of setting the first zone and the second zone to the LALM, copying the valid data of other zones stored in the garbage collection source block group in the shared write buffer to each of the unwritten area of the block group assigned to the first zone and the unwritten area of the block group assigned to the second zone, and writing the subsequent write data of the first zone and the subsequent write data of the second zone to the shared write buffer, and (3) an operation of copying the write data of the first zone in the shared write buffer to the new block group assigned to the first zone, which are executed in the SSD 3 according to at least one embodiment.

First, the zone #1 and the zone #2 are set to the normal mode and are assigned with the super block SB1 and the super block SB2, respectively. At this time, the controller 4 writes the write data (zone #1) which is to be written to the zone #1 to the super blocks SB1 in response to receiving the write command specifying the zone #1 set to the normal mode from the host 2. Further, the controller 4 writes the write data (zone #2) which is to be written to the zone #2 to the super block SB2 in response to receiving the write command specifying the zone #2 set to the normal mode from the host 2.

Herein, a valid data A of another zone (for example, the zone #(k−1)) already set to the LALM and an invalid data of another zone (for example, the zone #k) already set to the LALM are stored in the super block SB13 in the shared write buffer 201, and a valid data B of another zone (for example, the zone #(k−1)) already set to the LALM, an invalid data of another zone (for example, the zone #k) already set to the LALM, and a valid data C of another zone (for example, the zone #(k−1)) already set to the LALM are also stored in the super block SB14. The zone #k is a zone in which the copy of the write data for one zone capacity from the shared write buffer 201 to the super block SB newly assigned to the zone #k is already completed.

After that, when the first time elapses from the shift to the opened state of the zone #1 in the state where the unwritten area having the first size or larger remains in the super block SB1, the controller 4 shifts the write mode of the zone #1 from the normal mode to the LALM.

In this case, first, the controller 4 sets the zone #1 to the LALM. Then, the controller 4 starts a garbage collection (GC) operation (compaction operation) of the shared write buffer 201.

In the GC operation of the shared write buffer 201, the controller 4 determines the super block SB1 as a GC destination super block. The GC destination super block is a block group used as a copy destination super block in the GC operation.

Furthermore, the controller 4 selects the super block SB including the valid data and the invalid data as a GC source super block from the set of the super blocks in the shared write buffer 201. The GC source super block is a block group used as a copy source super block in the GC operation.

For example, the super block SB13 is selected as the GC source super block. The controller 4 copies the valid data A from the super block SB13 to the unwritten area of the super block SB1. Accordingly, the super block SB1 is set to the full state where the entire super block SB1 is filled with the data. Then, the controller 4 manages the super block SB1 as a super block assigned to the shared write buffer 201.

Further, when the first time elapses from the shift to the opened state of the zone #2 in the state where the unwritten area having the first size or larger remains in the super block SB2, the controller 4 shifts the write mode of the zone #2 from the normal mode to the LALM.

In this case, first, the controller 4 sets the zone #2 to the LALM. Then, the controller 4 starts the GC operation of the shared write buffer 201.

In the GC operation of the shared write buffer 201, the controller 4 determines the super block SB2 as the GC destination super block. Furthermore, the controller 4 selects the super block SB including the valid data and the invalid data as the GC source super block from the set of the super blocks in the shared write buffer 201.

For example, the super block SB14 is selected as the GC source super block. The controller 4 copies the valid data B and the valid data C from the super block SB14 to the unwritten area of the super block SB2. Accordingly, the super block SB2 is set to the full state where the entire super block SB2 is filled with the data. Then, the controller 4 manages the super block SB2 as a super block assigned to the shared write buffer 201.

The controller 4 writes the write data (zone #1) which is to be written to the zone #1 to the write destination super block (herein, the super block SB11) of the shared write buffer 201 in response to receiving the write command specifying the zone #1 set to the LALM from the host 2. The controller 4 writes the write data (zone #2) which is to be written to the zone #2 to the write destination super block (herein, the super block SB11) of the shared write buffer 201 in response to receiving the write command specifying the zone #2 set to the LALM from the host 2.

At this time, the controller 4 updates the L2P table 32-1 corresponding to the zone #1 so that the physical address PBA indicating the position in the shared write buffer 201 in which the write data (zone #1) is written is associated with the LBA of the write data (zone #1). Furthermore, the controller 4 updates the L2P table 32-2 corresponding to the zone #2 so that the physical address PBA indicating the position in the shared write buffer 201 in which the write data (zone #2) is written is associated with the LBA of the write data (zone #2).

When the super block SB11 assigned to the write destination super block in the shared write buffer 201 goes into the full state with no unwritten area, the controller 4 newly assigns the super block SB12 in the shared write buffer 201 as the write destination super block of the shared write buffer 201.

In response to receiving a write command specifying the zone #1 set to the LALM from the host 2, the controller 4 writes the write data (zone #1) which is to be written to the zone #1 to a new write destination super block (herein, the super block SB12) of the shared write buffer 201. The new write destination super block of the shared write buffer 201 is used as not only the write destination of the write data which is to be written to the zone #1 but also the write destination of the write data which is to be written to the zone #2 set to the LALM. That is, when the write command specifying the zone #2 set to the LALM is received from the host 2, the controller 4 writes the write data (zone #2) which is to be written to the zone #2 to the write destination super block (herein, the super block SB12) of the shared write buffer 201.

The controller 4 determines whether the total size of the write data which is to be written to the zone #1 stored in the shared write buffer 201 (herein, the super blocks SB1, SB11, and SB12) reaches the capacity of the zone #1.

When the total size of the write data which is to be written to the zone #1 stored in the shared write buffer 201 reaches the capacity of the zone #1, the controller 4 copies the write data which is to be written to the zone #1 stored in the shared write buffer 201 to the super block SB10 newly assigned to the zone #1.

Specifically, the write data (zone #1) stored in the super block SB1, the write data (zone #1) stored in the super block SB11, and the write data (zone #1) stored in the super block SB12 are copied to the super block SB10. Then, the controller 4 updates the Z2P table 31 so that the super block associated with the zone #1 is changed from the super block SB1 to the super block SB10.

As described above, in the second method, when the first time elapses from the shift to the opened state of the zone #1 in the state where the unwritten area having the first size or larger remains in the super block SB1, the controller 4 copies the valid data of other zones already set to the LALM from the GC source super block selected from the set of the super blocks SB provided in the shared write buffer 201 to the unwritten area of the super block SB1. Accordingly, the super block SB1 is set to the full state.

The GC operation in the shared write buffer 201 is an operation that will eventually be required. For this reason, write amplification can be reduced as compared with the first method of setting the super block SB1 to the full state by writing the dummy data to the unwritten area of the super block SB1.

Similarly to the zone #1, even when the total size of the write data which is to be written to the zone #2 stored in the shared write buffer 201 reaches the capacity of the zone #2, the controller 4 copies the write data which is to be written to the zone #2 stored in the shared write buffer 201 to the super block SB (not illustrated) newly assigned to the zone #2. Then, the controller 4 updates the Z2P table 31 so that the super block associated with the zone #2 is changed from the super block SB2 to the super block SB newly assigned to the zone #2.

Figure 13:
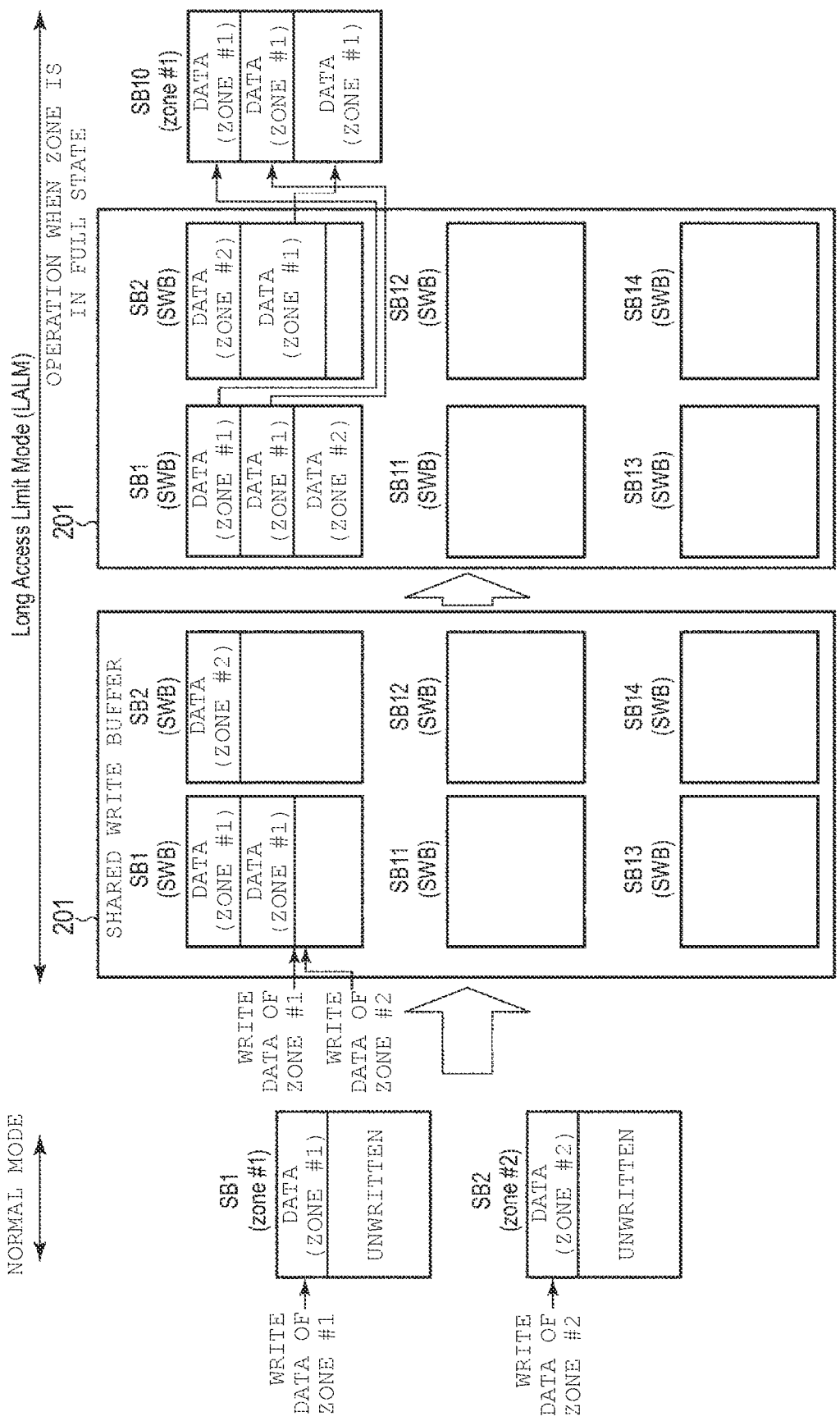
FIG. 13 is a diagram illustrating (1) an operation of controlling the first zone and the second zone in a normal mode, (2) an operation of setting the first zone and the second zone to the LALM, managing the block group assigned to the first zone as a write destination block group of the shared write buffer, and writing the subsequent write data of the first zone and the subsequent write data of the second zone to the write destination block group in the shared write buffer, and (3) an operation of copying the write data of the first zone in the shared write buffer to a new block group assigned to the first zone, which are executed in the memory system according to at least one embodiment.

Next, a third method of setting the zone satisfying the shift condition, among the zones set to the normal mode, to the LALM will be described. FIG. 13 is a diagram illustrating (1) an operation of controlling the first zone and the second zone in a normal mode, (2) an operation of setting the first zone and the second zone to the LALM, managing the block group assigned to the first zone as the write destination block group of the shared write buffer, and writing the subsequent write data of the first zone and the subsequent write data of the second zone to the write destination block group in the shared write buffer, and (3) an operation of copying the write data of the first zone in the shared write buffer to a new block group assigned to the first zone.

In the third method, the first time which is the timing for determining the shift from the normal mode to the LALM is set to a time shorter than that in the first method and the second method described above by a predetermined time.

First, the zone #1 and the zone #2 are set to the normal mode and are assigned with the super block SB1 and the super block SB2, respectively. At this time, the controller 4 writes the write data (zone #1) which is to be written to the zone #1 to the super block SB1 in response to receiving the write command specifying the zone #1 set to the normal mode from the host 2. Further, the controller 4 writes the write data (zone #2) which is to be written to the zone #2 to the super block SB2 in response to receiving the write command specifying the zone #2 set to the normal mode from the host 2.

After that, when the first time elapses from the shift to the opened state of the zone #1 in the state where the unwritten area having the first size or larger remains in the super block SB1, the controller 4 predicts whether the super block SB1 will be in the full state within the time limit based on the write speed of the zone #1, that is, based on the first time and the total size of the write data written to the super block SB1.

When it is predicted that the super block SB1 will not be in the full state within the time limit, the controller 4 shifts the super block SB1 from the normal mode to the LALM.

In this case, first, the controller 4 sets the zone #1 to the LALM. Then, the controller 4 assigns the super block SB1 to the shared write buffer 201 as a write destination super block to which the write data for the zone #1 and the write data for other zones already set to the LALM are to be written without performing any one of the process of writing the dummy data to the unwritten area of the super block SB1 and the process of copying the valid data of the GC source super block to the unwritten area of the super block SB1.

Further, when the first time elapses from the shift to the opened state of the zone #2 in the state where the unwritten area having the first size or larger remains in the super block SB2, the controller 4 predicts whether the super block SB2 will be in the full state within the time limit based on the write speed of the zone #2, that is, based on the first time and the total size of the write data written to the super block SB2.

When it is predicted that the super block SB2 will not be in the full state within the time limit, the controller 4 shifts the super block SB2 from the normal mode to the LALM.

In this case, first, the controller 4 sets the zone #2 to the LALM. Then, the controller 4 assigns the super block SB2 as the next write destination super block of the shared write buffer 201 without performing any one of the process of writing the dummy data to the unwritten area of the super block SB2 and the process of copying the valid data of the GC source super block to the unwritten area of the super block SB2. That is, the super block SB2 is used as the write destination super block of the shared write buffer 201 after the super block SB1 goes into the full state.

The controller 4 writes the write data (zone #1) which is to be written to the zone #1 to the write destination super block (herein, the super block SB1) of the shared write buffer 201 in response to receiving the write command specifying the zone #1 set to the LALM from the host 2. The controller 4 writes the write data (zone #2) which is to be written to the zone #2 to the write destination super block (herein, the super block SB12) of the shared write buffer 201 in response to receiving the write command specifying the zone #2 set to the LALM from the host 2.

At this time, the controller 4 updates the L2P table 32-1 corresponding to the zone #1 so that the physical address PBA indicating the position in the shared write buffer 201 in which the write data (zone #1) is written is associated with the LBA of the write data (zone #1). Furthermore, the controller 4 updates the L2P table 32-2 corresponding to the zone #2 so that the physical address PBA indicating the position in the shared write buffer 201 in which the write data (zone #2) is written is associated with the LBA of the write data (zone #2).

When the super block SB1 assigned to the write-destination block in the shared write buffer 201 goes into the full state with no unwritten area, the controller 4 uses the super block SB2 in the shared write buffer 201 as a new write destination super block.

The controller 4 determines whether the total size of the write data which is to be written to the zone #1 stored in the shared write buffer 201 (herein, the super blocks SB1 and SB2) reaches the capacity of the zone #1.

When the total size of the write data which is to be written to the zone #1 stored in the shared write buffer 201 reaches the capacity of the zone #1, the controller 4 copies the write data which is to be written to the zone #1 stored in the shared write buffer 201 to the super block SB10 newly assigned to the zone #1. Specifically, the write data (zone #1) stored in the super block SB1 and the write data (zone #1) stored in the super block SB2 are copied to the super block SB10. Then, the controller 4 updates the Z2P table 31 so that the super block associated with the zone #1 is changed from the super block SB1 to the super block SB10.

As described above, in the third method, the unwritten areas of the super block SB1 and the super block SB2 is filled by the write operation of the subsequent write data. Therefore, the write amplification can be improved as compared with the first method of filling the unwritten area with the dummy data.

On the other hand, when it is predicted that the super block SB1 (or the super block SB2) will be in the full state within the time limit, the controller 4 maintains the zone #1 (or the zone #2) in the normal mode. After that, when the first time used in the first method elapses from the shift to the opened state of the zone #1 (or the zone #2) in the state where the unwritten area having the first size or larger remains in the super block SB1 (or the super block SB2), the controller 4 sets the zone #1 (or the zone #2) to the LALM. Then, the controller 4 writes the dummy data generated by the controller 4 to the unwritten area of the super block SB1 (or the super block SB2) and allows the super block SB1 (or the super block SB2) to be in the full state. After this, the controller 4 assigns the super block SB1 (or the super block SB2) to the shared write buffer 201.

Figure 14:
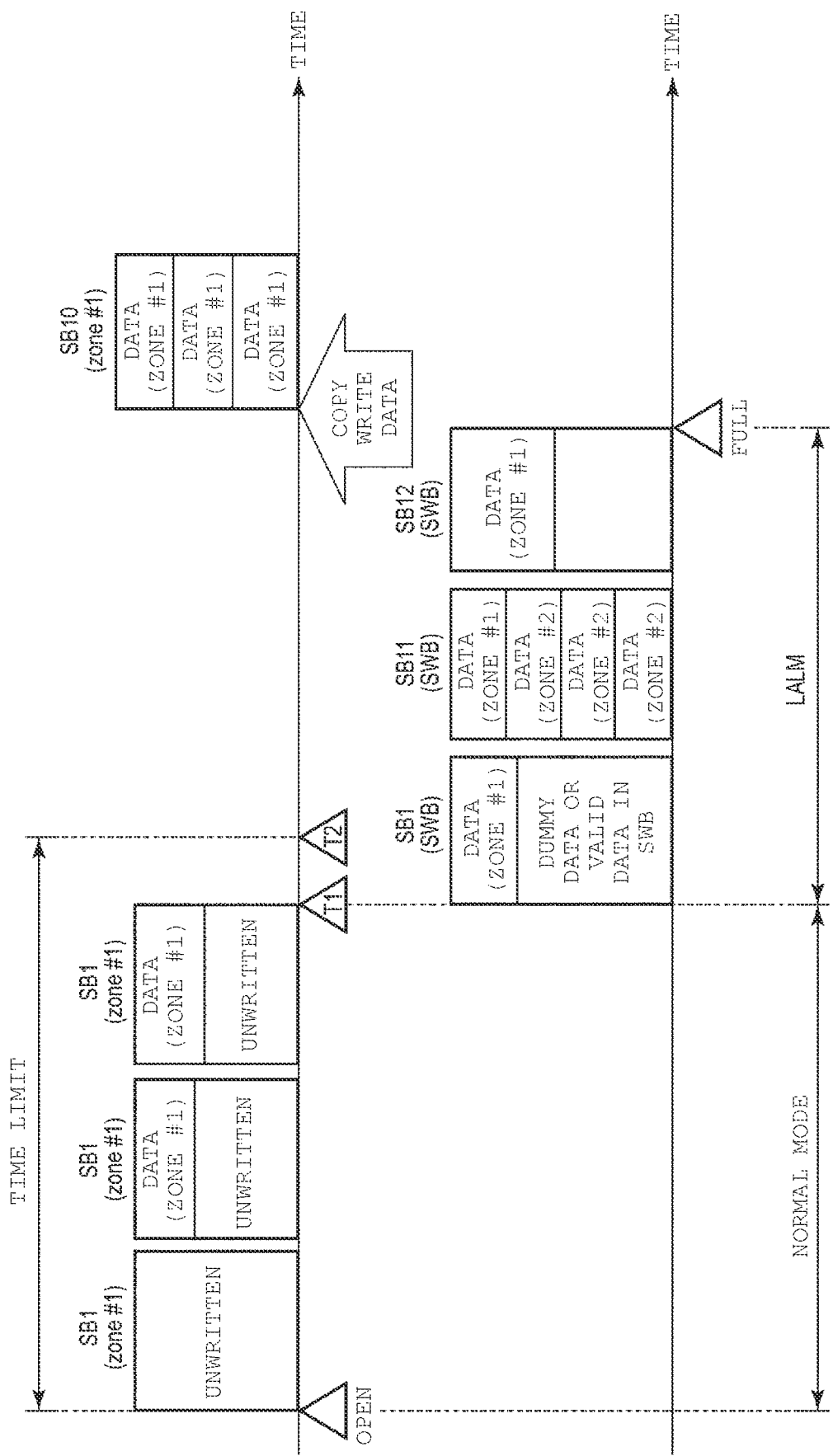
FIG. 14 is a diagram illustrating an operation of writing the write data to the first zone in the normal mode, setting the write mode of the first zone to the LALM at the time point T1, and writing the write data of the first zone and the write data of other zones set to the LALM to the shared write buffer until the first zone can be set to the full state from the time point T1, which is executed in the memory system according to at least one embodiment.

Next, the shift from the normal mode to the LALM according to the first method or the second method will be described in detail. FIG. 14 is a diagram illustrating an operation of writing the write data to the first zone in the normal mode, setting the write mode of the first zone to the LALM at the time point T1, and writing the write data of the first zone and the write data of other zones set to the LALM to the shared write buffer until the first zone can be set to the full state from the time point T1, which is executed in the SSD 3 according to the embodiment.

In FIG. 14, the time point T1 indicates a time point at which it is to be determined whether to shift the write mode of the zone #1 from the normal mode to the LALM. The time point T2 indicates a time point after the time limit elapses from the time point when the zone #1 is opened. The time from the time point when the zone #1 is opened to the time point T1 is set to a time corresponding to, for example, 99% of the time limit.

From the time point when the zone #1 is opened to time point T1, writing to the zone #1 is controlled in the normal mode. In the normal mode, the write data which is to be written to the zone #1 is written to the super block SB1 assigned to the zone #1. Therefore, every time the write command specifying the zone #1 is received from the host 2, the write data is written to the super block SB1. As time elapses, the total size of the write data stored in the super block SB1 increases.

When the super block SB1 has an unwritten area having the first size or larger at the time point T1, the controller 4 shifts the write mode of the super block SB1 to the LALM. The unwritten area of the super block SB1 is filled with the dummy data or the valid data in the shared write buffer 201. Then, the super block SB1 is managed as the shared write buffer 201.

The write data which is to be written to the zone #1 set to the LALM is written to the write destination super block SB11 of the shared write buffer 201. The write data which is to be written to another zone (for example, the zone #2) already set to the LALM is also written to the write destination super block SB11 of the shared write buffer 201. When the entire write destination super block SB11 is filled with write data, another super block SB12 is assigned as a new write destination super block in the shared write buffer 201. The write data which is to be written to the zone #1 and the write data which is to be written to another zone (for example, the zone #2) are written to the new write destination super block SB12.

When the total size of the write data which is to be written to the zone #1 stored in the shared write buffer 201 (super blocks SB1, SB11, and SB12) reaches the size with which the zone #1 is in the full state, that is, the capacity of the zone #1, the write data which is to be written to the zone #1 is copied from the shared write buffer 201 (super blocks SB1, SB11, and SB12) to the super block SB10 newly assigned to the zone #1.

Figure 15:
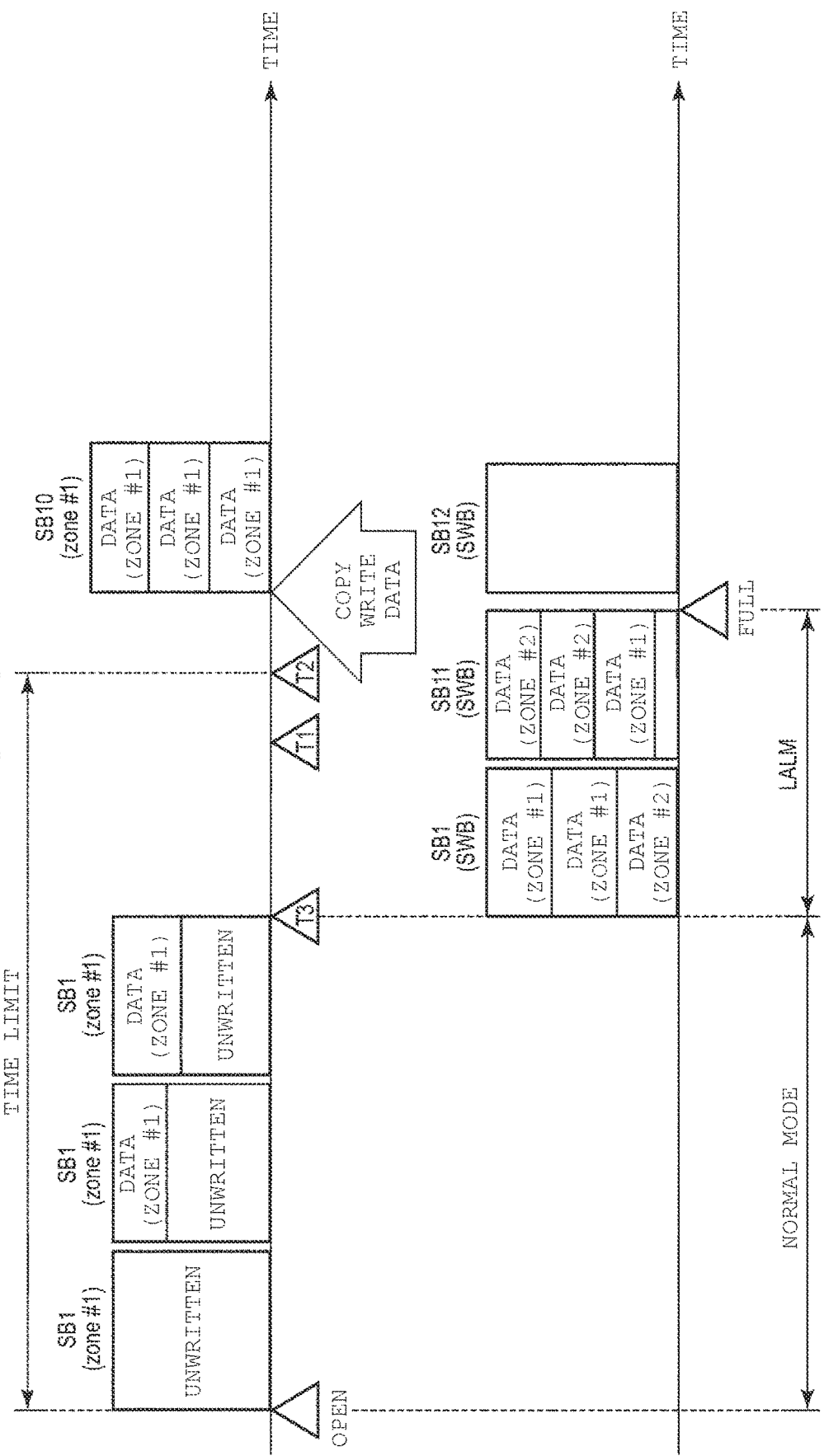
FIG. 15 is a diagram illustrating an operation of writing the write data to the first zone in the normal mode, setting the write mode of the first zone to the LALM at the time point T3, and writing the write data of the first zone and the write data of other zones set to the LALM to the shared write buffer until the first zone can be set to the full state from the time point T3, which is executed in the memory system according to at least one embodiment.

Next, the details of the shift from the normal mode to the LALM according to the third method will be described. FIG. 15 is a diagram illustrating an operation of writing the write data to the first zone in the normal mode, setting the write mode of the first zone to the LALM at the time point T3, and writing the write data of the first zone and the write data of other zones set to the LALM to the shared write buffer until the first zone can be set to the full state from the time point T3, which is executed in the SSD 3 according to the embodiment.

Herein, focusing on the zone #1, the shift from the normal mode to the LALM by the third method will be described. First, the controller 4 writes the write data which is to be written to the zone #1 to the super block SB1 assigned to the zone #1 from the opening of the zone #1 to the time point T3.

Herein, the time point T3 may be a time point earlier by a predetermined time than the time point T1 at which the determination for setting to the LALM is executed by the first method and the second method.

When the super block SB1 has an unwritten area having the first size or larger at the time point T3, the controller 4 calculates the write speed of the zone #1. Then, the controller 4 predicts whether the super block SB1 will be in the full state by the time point T2 corresponding to the time limit, based on the calculated write speed.

When it is predicted that the super block SB1 will not be in the full state by the time point T2, the controller 4 assigns the super block SB1 to the shared write buffer (SWB) 201 and sets the zone #1 to the LALM. At this time, the controller 4 assigns the super block SB1 to the write destination super block of the shared write buffer (SWB) 201.

The write data which is to be written to the zone #1 set to the LALM is written to the unwritten area of the super block SB1 assigned as the write destination super block of the shared write buffer (SWB) 201. The write data which is to be written to another zone (for example, the zone #2) that has already been set to the LALM is also written to the unwritten area of the super block SB1 assigned as the write destination super block of the shared write buffer (SWB) 201.

When the entire super block SB1 is filled with write data, another super block SB11 is assigned as a new write destination super block of the shared write buffer 201. The write data which is to be written to the zone #1 and the write data which is to be written to another zone (for example, the zone #2) are written to the new write destination super block SB12.

When the total size of the write data which is to be written to the zone #1 stored in the shared write buffer 201 (super blocks SB1 and SB11) reaches the size with which the zone #1 goes into the full state, the write data which is to be written to the zone #1 is copied from the shared write buffer 201 (super blocks SB1 and SB11) to the super block SB10 newly assigned to the zone #1.

Figure 16:
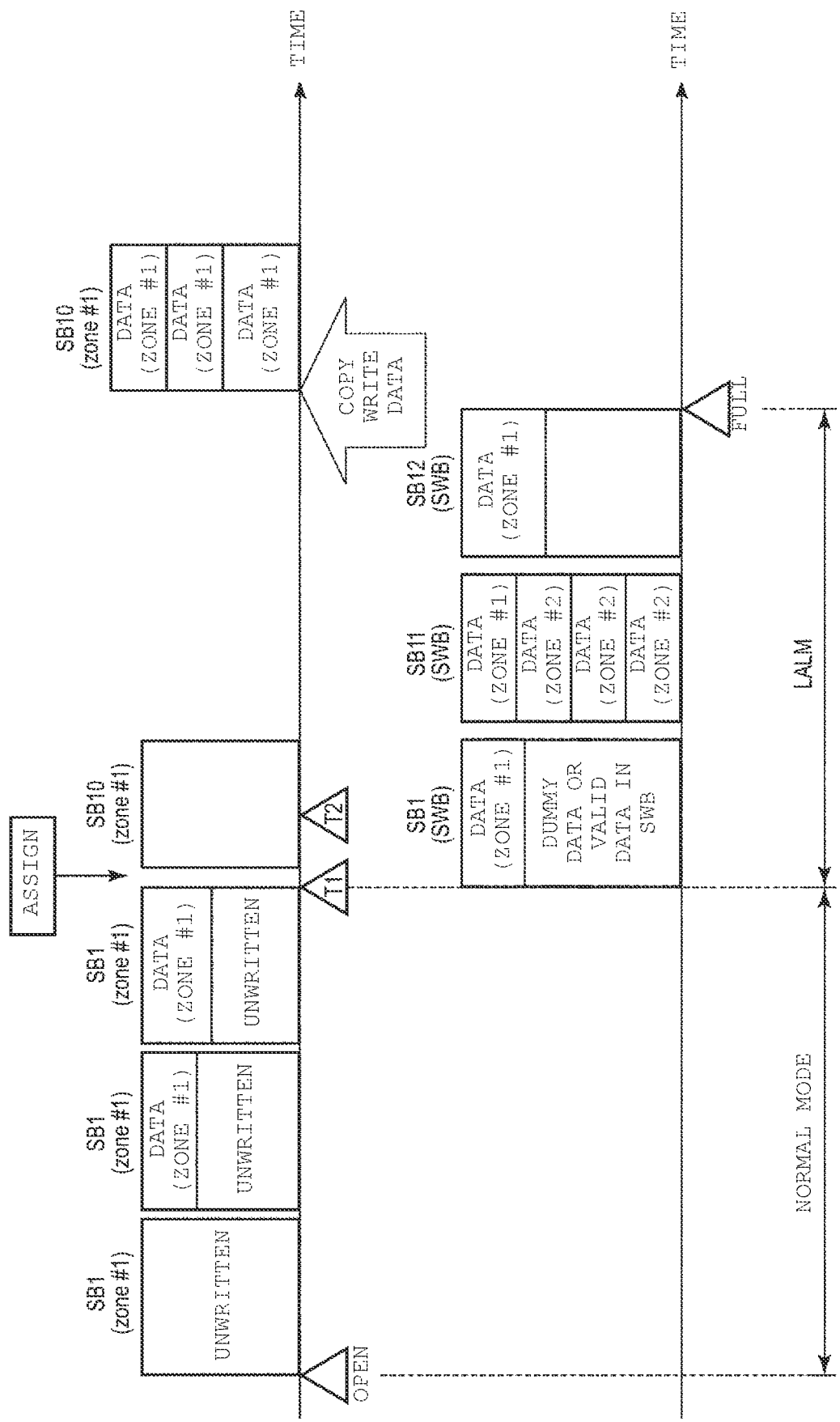
FIG. 16 is a diagram illustrating a first example of assignment timing for assigning a new block to the first zone used in the memory system according to at least one embodiment.

Next, the timing of assigning the new super block to the zone will be described. FIG. 16 is a diagram illustrating a first example of assignment timing for assigning a new block to the first zone used in the SSD 3 according to at least one embodiment.

FIG. 16 illustrates a case where the super block SB10 is assigned to the zone #1 when the zone #1 is set to the LALM. Herein, it is assumed that the zone #1 is set to the LALM by the first method or the second method.

For example, at time point T1, the controller 4 determines whether the super block SB1 assigned to the zone #1 has an unwritten area having the first size or larger. When the super block SB1 has an unwritten area having the first size or larger, the controller 4 selects one super block SB10 from a set of the free super blocks in which no valid data is stored. Then, the controller 4 assigns the selected super block SB10 as a new super block for the zone #1. At this time point, the controller 4 does not need to execute an erasing operation on the super block SB10.

The controller 4 sets the zone #1 to the LALM. The controller 4 fills the unwritten area of the super block SB1 with the dummy data or the valid data in the shared write buffer 201. The controller 4 manages the super block SB1 as the shared write buffer (SWB) 201.

The controller 4 writes the write data which is to be written to the zone #1 set to the LALM and the write data which is to be written to another zone (for example, the zone #2) already set to the LALM to the shared write buffer 201.

When the total size of the write data which is to be written to the zone #1 stored in the shared write buffer 201 (super blocks SB1, SB11, and SB12) reaches the size with which the zone #1 goes into the full state, the controller 4 executes the erasing operation on the super block SB10. Then, the controller 4 copies the write data which is to be written to the zone #1 stored in the shared write buffer 201 (super blocks SB1, SB11, and SB12) to the super block SB10 assigned to the zone #1.

In this manner, when setting the zone #1 to the LALM, the copy destination (herein, super block SB10) of the write data of the zone #1 is prepared. Accordingly, even when the variable capacity SB is used, the controller 4 can easily allocate a super block having a capacity equal to or larger than the capacity of the super block (herein, the super block SB1) originally assigned to the zone #1.

Further, when there is no free super block having a capacity equal to or larger than the capacity of the super block SB1 at time point T1, the controller 4 executes a process (Correspondence 1) of shifting the zone #1 to the full state without setting the zone #1 to the LALM or a process (Correspondence 2) of assigning the super block having a capacity smaller than that of the super block SB1 to the zone #1 and notifying the host 2 that the capacity of the zone #1 is changed to that capacity.

The controller 4 executes Zone Active Excursion defined by the ZNS as a process of shifting the zone #1 to the full state. In the Zone Active Excursion, for example, the controller 4 may fill the unwritten area of the super block SB1 with the dummy data generated by the controller 4.

When the process of (2) is executed, the zone #1 is set to the LALM. However, since the host 2 is notified that the capacity of the zone #1 is changed (is changed to the capacity of the super block (for example, the super block SB10) having a capacity smaller than that of the super block SB1 assigned to the zone #1), there is no discrepancy between the capacity of the zone #1 recognized by the host 2 and the capacity actually writable in the zone #1.

Figure 17:
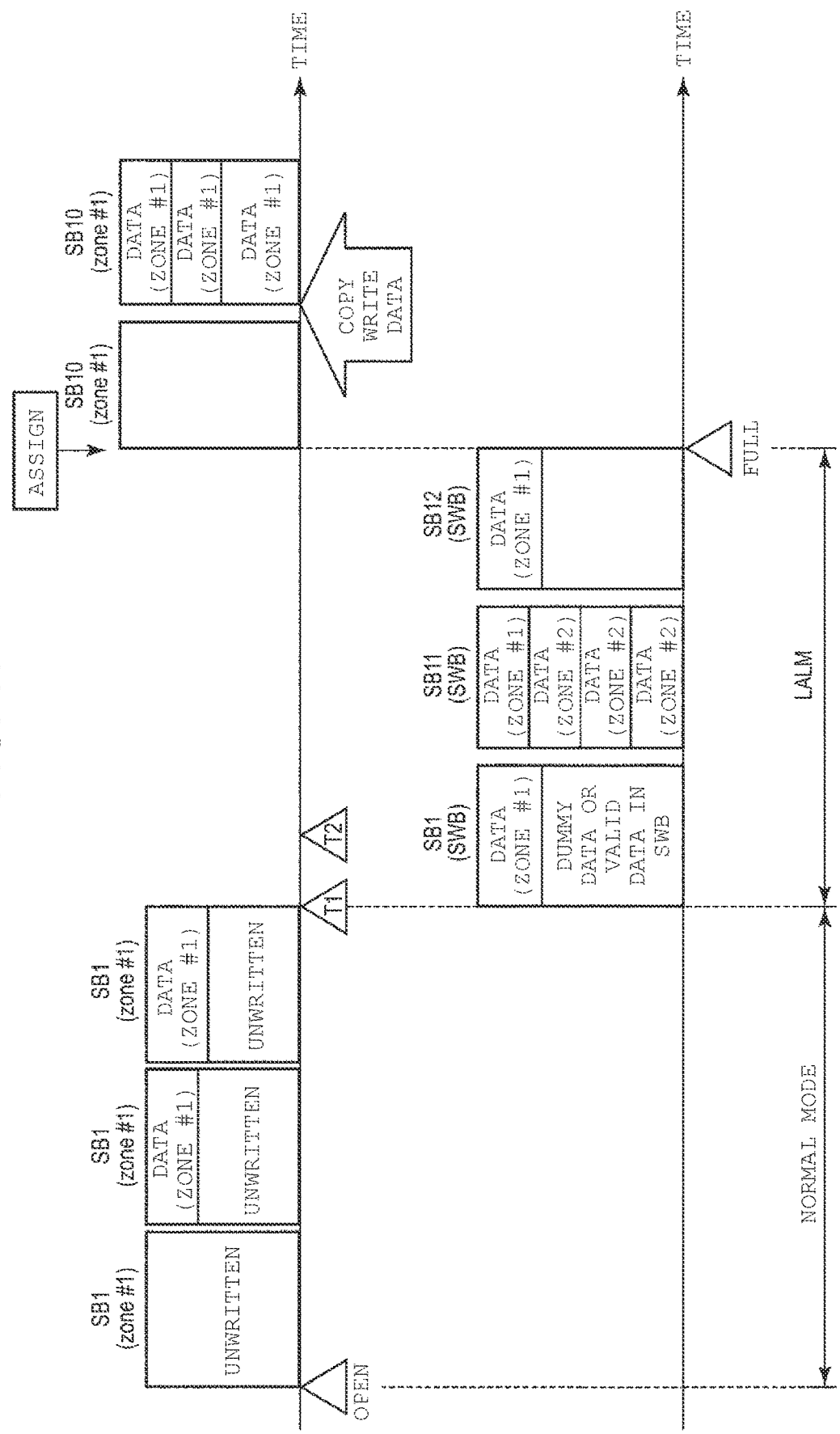
FIG. 17 is a diagram illustrating a second example of assignment timing for assigning a new block to the first zone used in the memory system according to at least one embodiment.

FIG. 17 is a diagram illustrating a second example of the assignment timing for assigning a new block to the first zone used in the SSD 3 according to at least one embodiment.

In FIG. 17, described is a case where the super block SB10 is assigned to the zone #1 when the total size of the write data which is to be written to the zone #1 stored in the shared write buffer 201 reaches the capacity of the zone #1. Herein, it is assumed that the zone #1 is set to the LALM by the first method or the second method.

For example, at the time point T1, the controller 4 determines whether the super block SB1 assigned to the zone #1 has an unwritten area having the first size or larger. When the super block SB1 has an unwritten area having the first size or larger, the controller 4 sets the zone #1 to the LALM.

The controller 4 fills the unwritten area of the super block SB1 with a dummy data or a valid data in the shared write buffer 201. The controller 4 manages the super block SB1 as the shared write buffer (SWB) 201.

The controller 4 writes the write data which is to be written to the zone #1 set to the LALM and the write data which is to be written to another zone (for example, the zone #2) already set to the LALM to the shared write buffer 201.

When the total size of the write data which is to be written to the zone #1 stored in the shared write buffer 201 (super blocks SB1, SB11, and SB12) reaches the size with which the zone #1 goes into the full state, the controller 4 selects one super block SB10 from a set of free super blocks in which no valid data is stored. Then, the controller 4 assigns the selected super block SB10 as a new super block for the zone #1. At this time point, the controller 4 executes the erasing operation on the super block SB10.

Then, the controller 4 copies the write data which is to be written to the zone #1 stored in the shared write buffer 201 (super blocks SB1, SB11, and SB12) to the super block SB10 newly assigned to the zone #1.

Accordingly, since each of the free super blocks including the super block SB10 can be used for various uses until the data corresponding to the zone capacity to be written to the zone #1 is prepared in the shared write buffer 201, the write amplification can be improved as compared with the case where the super block SB10 is assigned to the zone #1 at the timing which is described with reference to FIG. 16.

However, at the timing of assigning the super block SB10 to the zone #1, since the write data corresponding to the capacity of the zone #1 already exists in the shared write buffer 201, it is impossible to change the capacity of the zone #1. Therefore, when the variable capacity SB is used, the assignment of a new super block at this timing is not realistic. Therefore, the process of FIG. 17 is useful when using a fixed capacity SB.

Finally, a new super block assignment timing suitable for the case where the variable capacity SB is used will be described.

Figure 18:
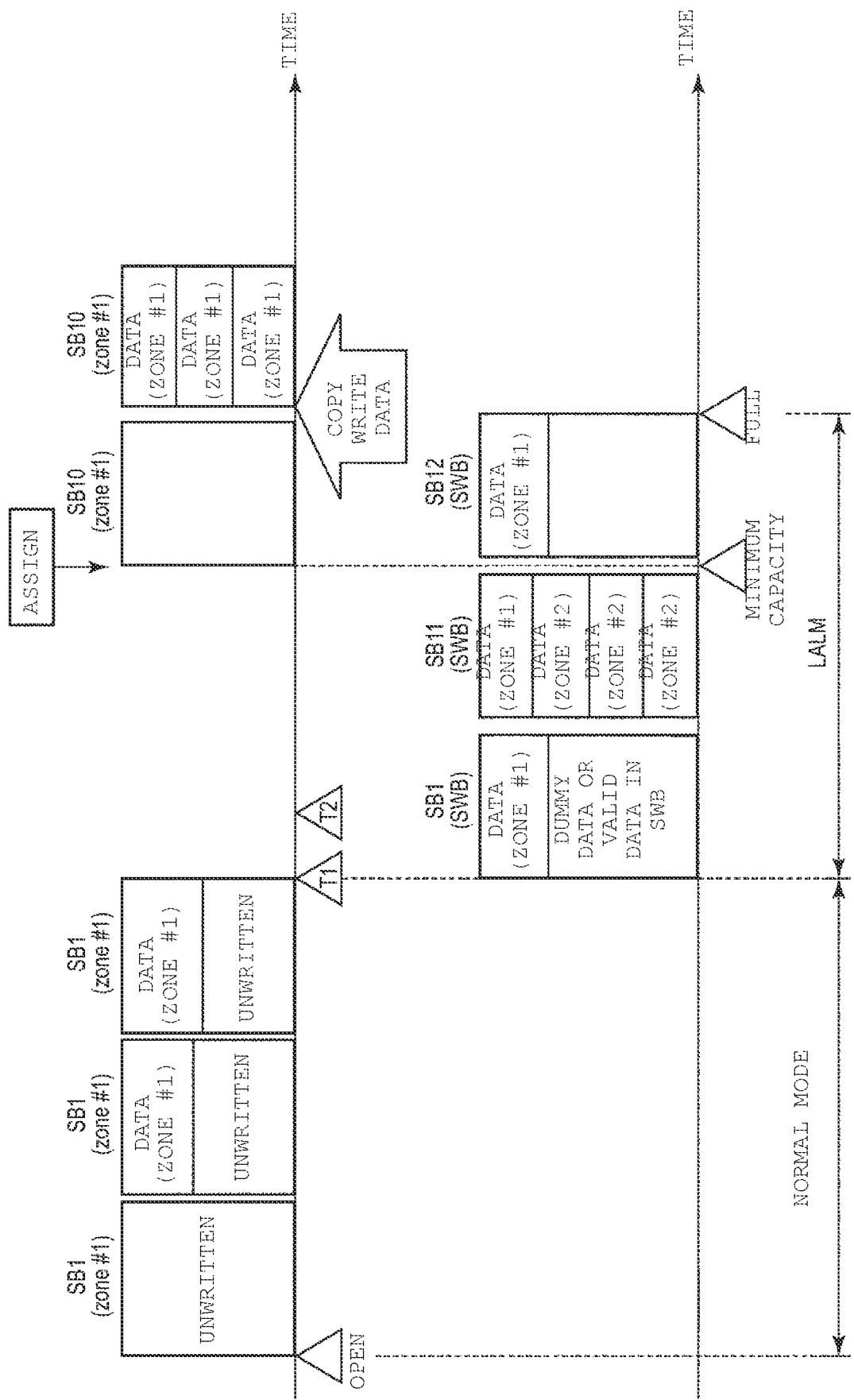
FIG. 18 is a diagram illustrating a third example of assignment timing for assigning a new block to the first zone used in the memory system according to at least one embodiment.

FIG. 18 is a diagram illustrating a third example of the assignment timing for assigning a new block to the first zone used in the SSD 3 according to at least one embodiment.

In FIG. 18, described is a case where the super block SB10 is assigned to the zone #1 when the total size of the write data which is to be written to the zone #1 stored in the shared write buffer 201 reaches the minimum capacity among the capacities of the plurality of types of super blocks managed by the controller 4. Herein, it is assumed that the zone #1 is set to the LALM by the first method or the second method.

For example, at a time point T1, the controller 4 determines whether the super block SB1 assigned to the zone #1 has an unwritten area having the first size or larger. When the super block SB1 has an unwritten area having the first size or larger, the controller 4 sets the zone #1 to the LALM.

The controller 4 fills the unwritten area of the super block SB1 with a dummy data or a valid data in the shared write buffer 201. The controller 4 manages the super block SB1 as the shared write buffer (SWB) 201.

The controller 4 writes the write data which is to be written to the zone #1 set to the LALM and the write data which is to be written to another zone (for example, the zone #2) already set to the LALM to the shared write buffer 201.

When the total size of the write data which is to be written to the zone #1 stored in the shared write buffer 201 (super blocks SB1 and SB11) reaches the minimum capacity among the capacities of the plurality of types of super blocks managed by the controller 4, the controller 4 selects one super block SB10 from the set of the free super blocks in which no valid data is stored. Then, the controller 4 assigns the selected super block SB10 as a new super block for the zone #1.

For example, when the capacity of the super block used in the SSD 3 is in the range of 64 MB to 128 MB, the controller 4 determines whether the total size of the write data which is to be written to the zone #1 stored in the shared write buffer 201 reaches 64 MB.

When the total size of the write data which is to be written to the zone #1 stored in the shared write buffer 201 reaches 64 MB, the controller 4 selects the super block SB10 from the set of the free super blocks and assigns the selected super block SB10 to the zone #1. Every super block provided in the set of the free super blocks is 64 MB or more. Therefore, the capacity of the super block SB10 selected from the set of the free super blocks is guaranteed to be 64 MB or more. Therefore, it is possible to reliably allocate a super block having a capacity capable of storing all the write data of the zone #1 stored in the shared write buffer 201 until now as a new super block for the zone #1.

The capacity of the super block SB10 newly assigned to the zone #1 is 64 MB or more. However, when the capacity of the super block SB1 is, for example, 128 MB, in some cases, the capacity of the super block SB10 may be smaller than the capacity of the super block SB1.

When the capacity of the super block SB10 newly assigned to the zone #1 is smaller than the capacity of the super block SB1, the controller 4 notifies the host 2 that the capacity of the zone #1 is changed to the capacity of the super block SB10. Then, when the total size of the write data which is to be written to the zone #1 stored in the shared write buffer 201 reaches the capacity of the zone #1 after being changed, that is, the capacity of the super block SB10, the controller 4 executes the erasing operation on the super block SB10. Then, the controller 4 copies the write data which is to be written to the zone #1 stored in the shared write buffer 201 (herein, the super blocks SB1, SB11, and SB12) to the super block SB10.

Accordingly, the variable capacity SB can be supported, and the write amplification can be reduced as compared with the case where the new super block is assigned to the zone #1 at the timing described in FIG. 16.

Figure 19:
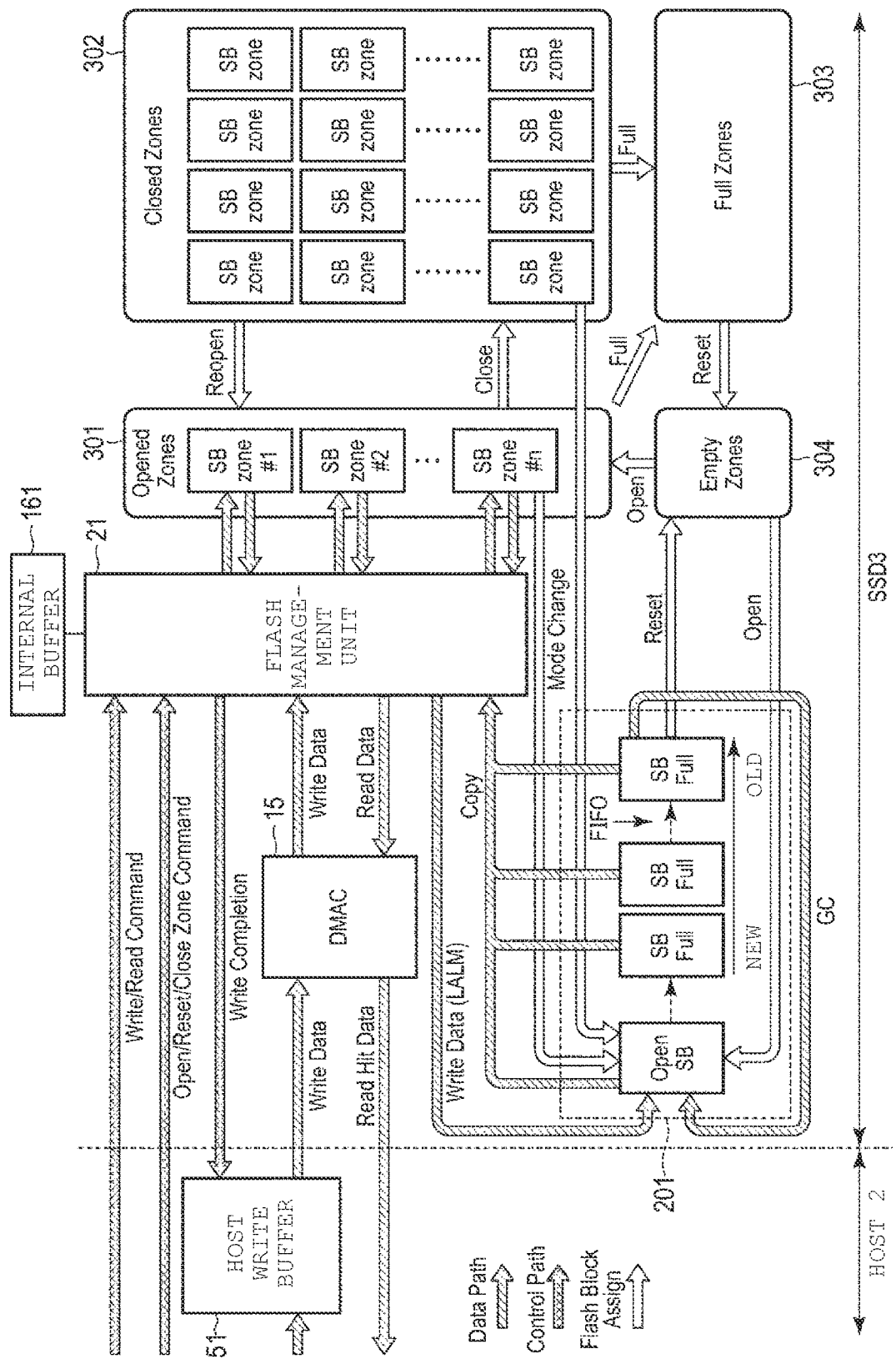
FIG. 19 is a block diagram illustrating an example of a write operation sequence, a read operation sequence, and a block group management sequence executed in the memory system according to at least one embodiment.

Next, the write operation and the read operation executed in the SSD 3 will be described. FIG. 19 is a block diagram illustrating a sequence of the write operations and a sequence of the read operation executed in the SSD 3.

The controller 4 of the SSD 3 is configured to manage the mapping between the plurality of block groups (that is, the plurality of super blocks SB) and the plurality of zones. Therefore, the controller 4 can assign any super block SB as the physical storage area of one zone.

One super block SB corresponding to one zone is accessed by using consecutive logical addresses included in the LBA range assigned to the zone. The writing within one zone is basically performed sequentially.

The states of the respective zones are roughly divided into an opened state (opened zone), a closed state (closed zone), a full state (full zone), and an empty state (empty zone).

The opened state zone is a zone assigned as a write destination zone where the data can be written. When a certain zone is opened, the super block SB corresponding to the zone is assigned as an opened state physical storage area available for writing the data. The flash management unit 21 manages each opened state zone, that is, the super block SB corresponding to each opened state zone by using an opened zone list 301.

The closed state zone is a zone in which the writing is interrupted. The super block SB corresponding to the zone in which the writing is interrupted is a super block SB in which the data is written only in a portion of the super block SB, that is, a partially written super block SB. In the super block SB corresponding to the closed state zone, some pages available for writing the data remain. The flash management unit 21 manages each closed state zone, that is, the super block SB corresponding to each closed state zone by using a closed zone list 302.

The full state zone is a zone where the entire zone is filled with the data. The super block SB corresponding to the full state zone is a block in which the writing to all pages in the super block SB is completed. The flash management unit 21 manages each full state zone, that is, the super block SB corresponding to each full state zone by using a full zone list 303.

The empty state zone is a reset zone. The super block SB corresponding to the empty state zone is a free super block SB in which a valid data is not stored. The flash management unit 21 manages each empty state zone, that is, the super block SB corresponding to each empty state zone by using an empty zone list 304.

When the host 2 desires to write data to the empty state zone, the host 2 transmits an open zone command including a parameter specifying this empty state zone, that is, an open zone command specifying the ZSLBA for this empty state zone to the SSD 3. The open zone command is used as a command for assigning one of the super blocks SB as an opened state physical storage area available for writing the data. When receiving this open zone command from the host 2, the flash management unit 21 selects one super block SB from the empty state super blocks SB managed by the empty zone list 304. Then, the flash management unit 21 executes the erasing operation on the selected super block SB and, thus, assigns the selected super block SB as the opened state physical storage area. As a result, the state of the zone specified by the open zone command is shifted from the empty state to the opened state.

The host 2 can allow the plurality of zones to be in the opened state by repeatedly executing the process of transmitting the open zone command to the SSD 3.

For example, when the write command including the parameter specifying the opened state zone, that is, the write command specifying the ZSLBA for the opened state zone is received from the host 2, the flash management unit 21 transmits the write data associated with the received write command from the write buffer 51 of the host 2 to the internal buffer 161 by using the DMAC 15. Then, the flash management unit 21 writes the write data transmitted to the internal buffer 161 to the super block SB assigned to the zone #1. Then, the flash management unit 21 returns a response (write completion) indicating the completion of each write command to the host 2.

When the host 2 does not write the data to an opened state zone for some time, the host 2 transmits a close zone command for shifting the zone to the closed state to the SSD 3 so as to release an area in the write buffer 51 of the host 2 allocated to the zone.

For example, when the close zone command including the parameter specifying the zone #1, that is, the close zone command specifying the ZSLBA for the zone #1 is received from the host 2, the flash management unit 21 shifts the zone #1 to the closed state. In this case, the flash management unit 21 removes the zone #1, that is, the super block SB assigned to the zone #1 from the opened zone list 301 and adds the super block SB to the closed zone list 302.

When a write command including a parameter specifying a closed state zone is received from the host 2, the flash management unit 21 reassigns (reopens) the super block SB assigned to the zone as an opened state physical storage area.

When the entire zone is filled with the data, the flash management unit 21 shifts the state of the zone from the opened state or the closed state to the full state. The super block SB corresponding to the zone is managed as a full state super block SB.

When a read command requesting reading of a read target data is received from the host 2, the flash management unit 21 determines a read target zone based on the start LBA included in the read command and reads the read target data from the super block assigned to the read target zone. Then, the flash management unit 21 transmits the read target data read to the host 2 as the read hit data by using the DMAC 15.

When all the data stored in the full state zone becomes unnecessary data that is not used, the host 2 can transmit a reset command specifying the logical address indicating the zone to the SSD 3. In response to receiving the reset command from the host 2, the flash management unit 21 removes the super block SB assigned to the zone from the full zone list 303 and adds the super block SB to the empty zone list 304. Accordingly, the state of the zone is shifted from the full state to the empty state.

In response to the zone being set to the LALM, the flash management unit 21 assigns the super block assigned to the zone to the shared write buffer 201, and writes the dummy data or the valid data in the shared write buffer 201 to the unwritten area of the super block or assigns the super block assigned to the zone to the write destination super block in the shared write buffer 201 (Mode Change).

That is, in the first method and the second method, the flash management unit 21 allows the super block assigned to the zone to be in the full state and, after that, puts the super block in a FIFO list described later. In the third method, the flash management unit 21 assigns the super block assigned to the zone as the write destination super block (Open SB) in the shared write buffer 201.

In addition, for the slow write zones specified by the host 2, these zones are controlled in the LALM from the beginning.

In response to receiving the write command specifying the zone set to the LALM, the flash management unit 21 writes the write data associated with the write command to the write destination super block (Open SB) in the shared write buffer 201 (Write Data (LALM)). When the entire write destination super block in the shared write buffer 201 is filled with the data, the flash management unit 21 manages the write destination super block as a full state super block.

The flash management unit 21 may manage all the full state super blocks by using the first-in first out (FIFO) list. The FIFO list includes a plurality of entries. When one full state super block is put into the FIFO list, each super block already stored in each entry in the FIFO list is moved to the exit side of the FIFO list by one entry. The flash management unit 21 selects the super block (oldest super block) that reaches the exit of the FIFO list as the copy source block (GC source super block) for garbage collection of the shared write buffer 201. The flash management unit 21 determines whether a valid data is stored in the selected super block.

When no valid data is stored in the selected super block, the flash management unit 21 puts the selected super block in the empty zone list 304.

When a valid data is stored in the selected super block, the flash management unit 21 copies the valid data stored in the selected super block to the write destination super block (Open SB). Then, the flash management unit 21 updates the L2P table 32 and maps the physical address indicating the storage position in the write destination super block to which the valid data is copied to the logical address of the copied valid data. When the copying of all the valid data in the selected super block is completed, the flash management unit 21 returns the selected super block to the empty zone list 304.

When the number of available super blocks in the shared write buffer 201 is less than the threshold value, every time a new write destination super block needs to be assigned, that is, every time the entire write destination super block is filled with the data, the flash management unit 21 selects any super block from the free super blocks managed by the empty zone list 304 and assigns the selected super block as the new write destination super block.

Then, when the total size of the write data which is to be written to a certain zone stored in the shared write buffer reaches the capacity of the zone, the flash management unit 21 copies the write data which is to be written to the zone from the shared write buffer 201 to a new super block assigned to that zone.

Figure 20:
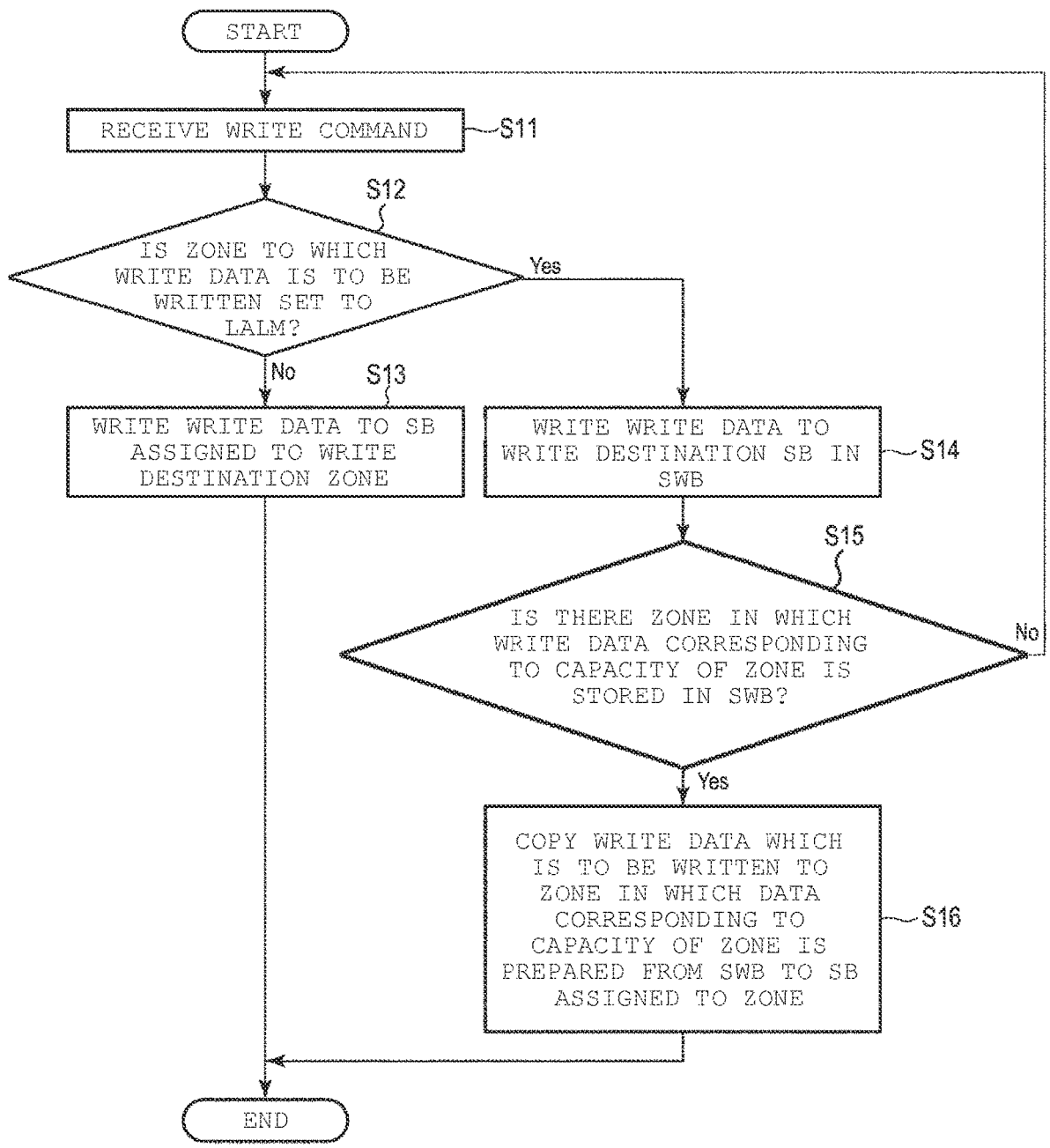
FIG. 20 is a flowchart illustrating a procedure of a write operation in the LALM executed in the memory system according to at least one embodiment.

FIG. 20 is a flowchart illustrating a procedure of the write operation in the LALM executed in the SSD 3 according to at least one embodiment.

First, the controller 4 receives a write command from the host 2 (step S11). The write command specifies the zone to which the write data associated with this write command is to be written.

The controller 4 determines whether the zone to which the write data is to be written is set to the LALM (step S12). That is, the controller 4 determines whether the zone specified by the write command received in step S11, that is, the write destination zone is set to the LALM.

When the write destination zone to which the write data is to be written is not set to the LALM (No in step S12), the controller 4 writes the write data to the super block assigned to the write destination zone (step S13).

When the write destination zone is set to the LALM (Yes in step S12), the controller 4 writes the write data to the write destination super block in the shared write buffer 201 (step S14). Herein, the controller 4 updates the L2P table 32 corresponding to the zone in order to manage the written write data.

The controller 4 determines whether there is a zone in which the write data corresponding to the capacity of the zone is stored in the shared write buffer 201 among the zones set to the LALM (step S15).

When there is no zone in which the write data corresponding to the capacity of the zone is stored in the shared write buffer 201 (No in step S15), the controller 4 waits until the next write command is issued from the host 2.

When there is a zone in which the write data corresponding to the capacity of the zone is stored in the shared write buffer 201 (Yes in step S15), the controller 4 copies the write data which is to be written to the zone in which the write data corresponding to the capacity of the zone is prepared from the shared write buffer 201 to the super block newly assigned to the zone (step S16).

Figure 21:
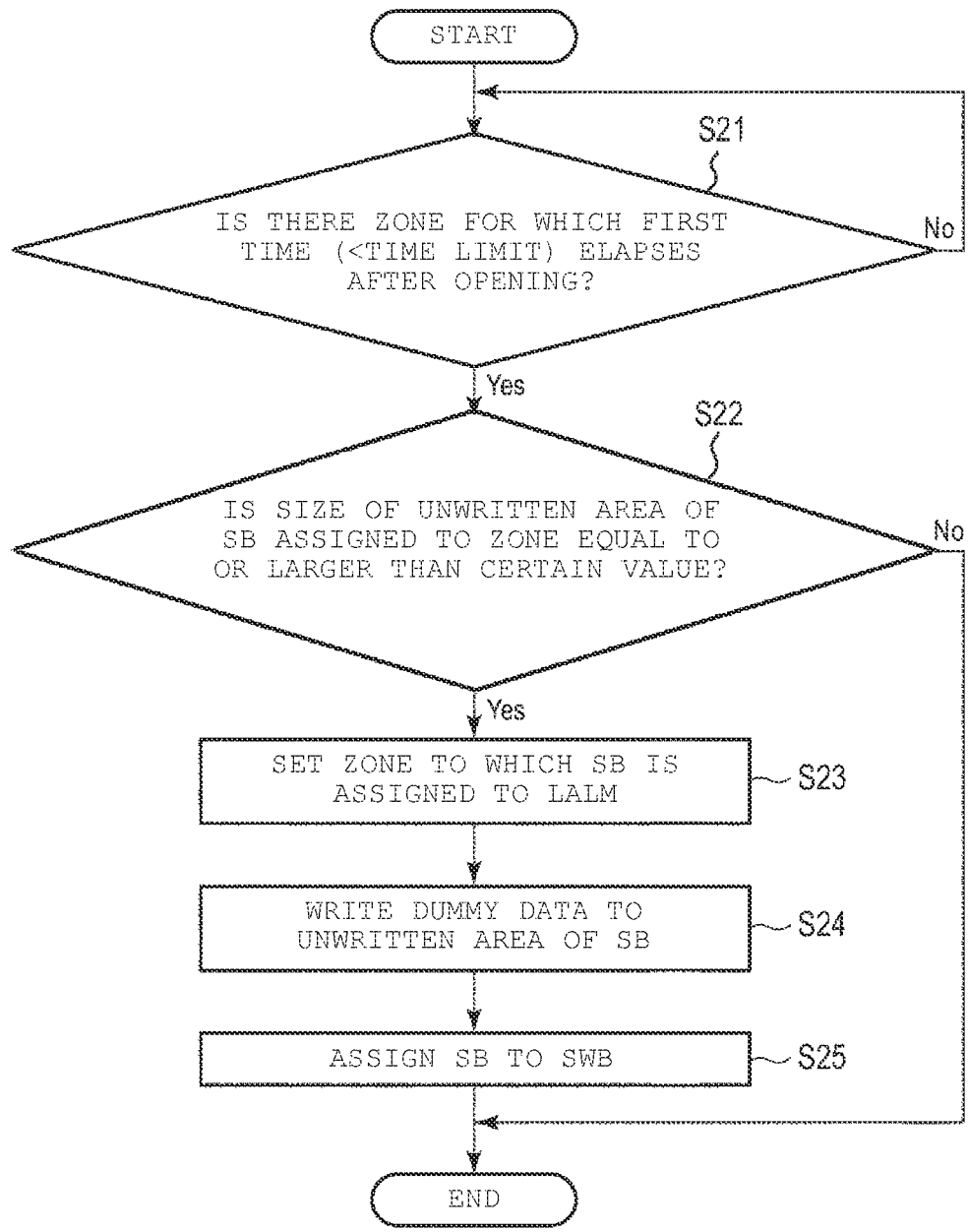
FIG. 21 is a flowchart illustrating a procedure of an operation of shifting the write mode of any zone from a normal mode to the LALM, which is executed in the memory system according to at least one embodiment.

FIG. 21 is a flowchart illustrating a procedure of an operation of shifting the write mode of any zone from the normal mode to the LALM, which is executed in the SSD 3 according to the embodiment. Herein, it is assumed that the zone is set to the LALM by the first method described with reference to FIG. 11.

The controller 4 determines whether there is a zone for which the first time (<time limit) elapses after opening (step S21). Herein, the first time may be a time close to the time limit.

When there is no zone for which the first time (<time limit) elapses after opening (No in step S21), the controller 4 waits until there is a zone for which the first time (<time limit) elapses after opening.

When there is a zone for which the first time (<time limit) elapses after opening (Yes in step S21), the controller 4 determines whether the size of the unwritten area of the super block assigned to the zone is equal to or larger than a certain value (step S22). In other words, the controller 4 determines whether the super block assigned to the zone has an unwritten area having a size equal to or larger than a certain value.

When the size of the unwritten area of the super block is not equal to or larger than a certain value (No in step S22), the controller 4 estimates that the super block assigned to the zone will be in the full state within the time limit and ends the process. In this case, the write mode of the zone is maintained in the normal mode.

When the size of the unwritten area of the super block is equal to or larger than a certain value (Yes in step S22), the controller 4 sets the zone to which the super block is assigned to the LALM (step S23).

The controller 4 writes the dummy data generated by the controller 4 to the unwritten area of the super block (step S24). Accordingly, the super block is set to the full state.

The controller 4 assigns the super block to the shared write buffer 201 (step S25). In other words, the controller 4 manages the super block assigned to the zone set to the LALM as the shared write buffer 201, that is, as an element of a set of the super blocks assigned to the shared write buffer 201.

The processes of steps S23 to S25 may be executed in the order as described or may be executed in any other order.

Figure 22:
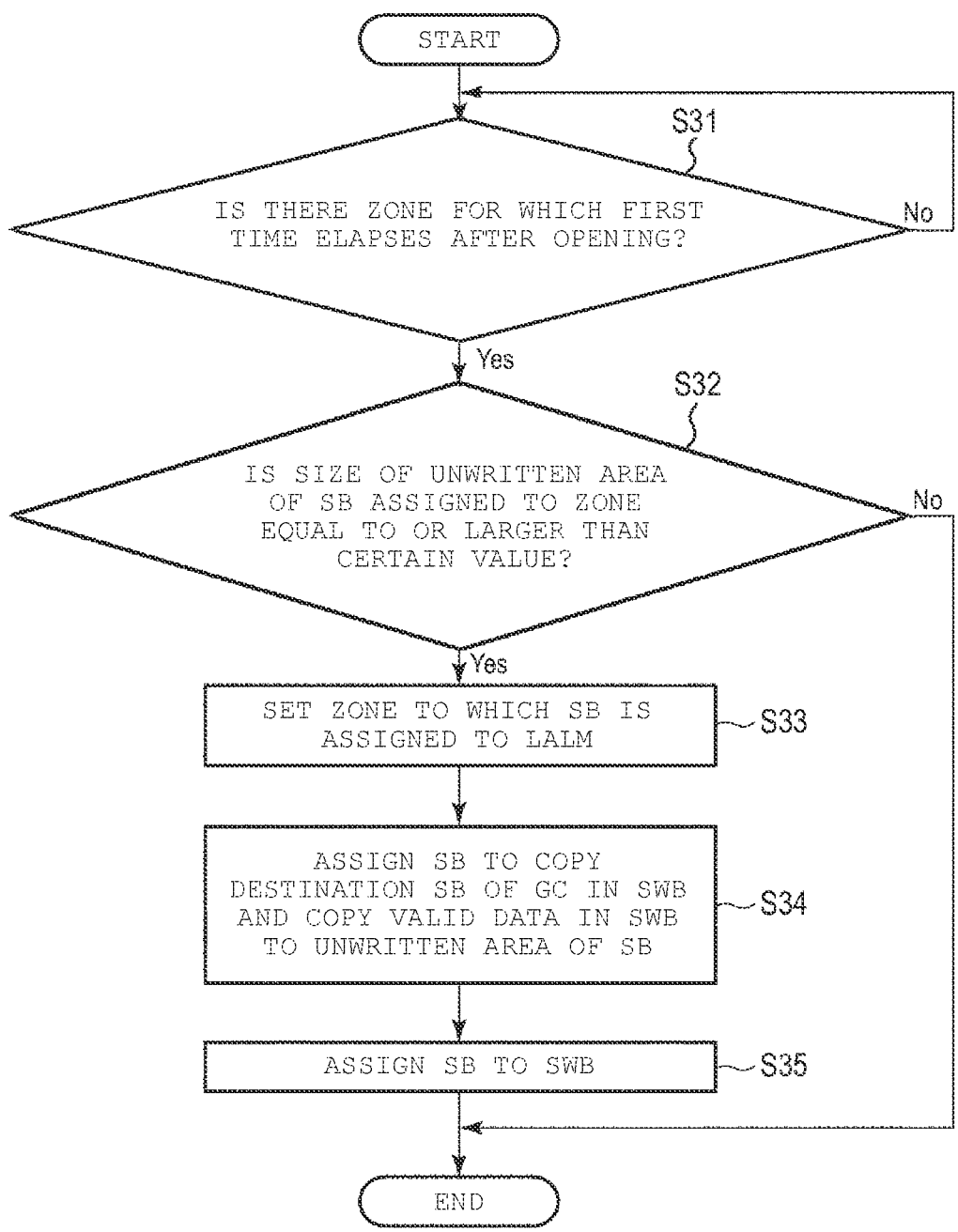
FIG. 22 is a flowchart illustrating another example of another procedure of the operation of shifting the write mode of any zone from the normal mode to the LALM, which is executed in the memory system according to at least one embodiment.

FIG. 22 is a flowchart illustrating another procedure of an operation of shifting the write mode of any zone from the normal mode to the LALM, which is executed in the SSD 3 according to the embodiment. Herein, it is assumed that the zone is set to the LALM by the second method described with reference to FIG. 12.

When there is a zone for which the first time (<time limit) elapses after opening (Yes in step S31), the controller 4 determines whether the size of the unwritten area of the super block assigned to the zone is equal to or larger than a certain value (step S32).

When the size of the unwritten area of the super block is not equal to or larger than a certain value (No in step S32), the controller 4 estimates that the super block assigned to the zone will be in the full state within the time limit and completes the process. In this case, the write mode of the zone is maintained in the normal mode.

When the size of the unwritten area of the super block is equal to or larger than a certain value (Yes in step S32), the controller 4 sets the zone to which the super block is assigned to the LALM (step S33).

The controller 4 assigns the super block as a copy destination super block (GC destination super block) of the GC operation in the shared write buffer 201 and copies the valid data in the shared write buffer 201 to the unwritten area of the super block (Step S34). Accordingly, the super block is set to full state.

In step S34, the controller 4 selects the GC source super block from the set of the super blocks provided in the shared write buffer 201. When a valid data of other zones already set to the LALM is stored in the selected GC source super block, the controller 4 copies the valid data to the unwritten area of the super block assigned as the GC destination super block. As described above, in step S34, the controller 4 copies the valid data of the other zone already set to the LALM from the GC source super block selected from the set of the super blocks provided in the shared write buffer 201 to the unwritten area of the super block assigned as the GC destination super block. Then, the controller 4 updates the L2P table 32 so that the physical address indicating the copy destination position in the GC destination super block to which the valid data is copied is associated with the LBA of the valid data.

The controller 4 assigns the super block (GC destination super block) set to the full state by the GC operation to the shared write buffer 201 (step S35). In other words, the controller 4 manages the super block assigned to the zone set to the LALM in step S33 as the shared write buffer 201, that is, as an element of the set of the super blocks assigned to the shared write buffer 201.

The processes of steps S33 to S35 may be executed in the order as described or may be executed in any other order.

Figure 23:
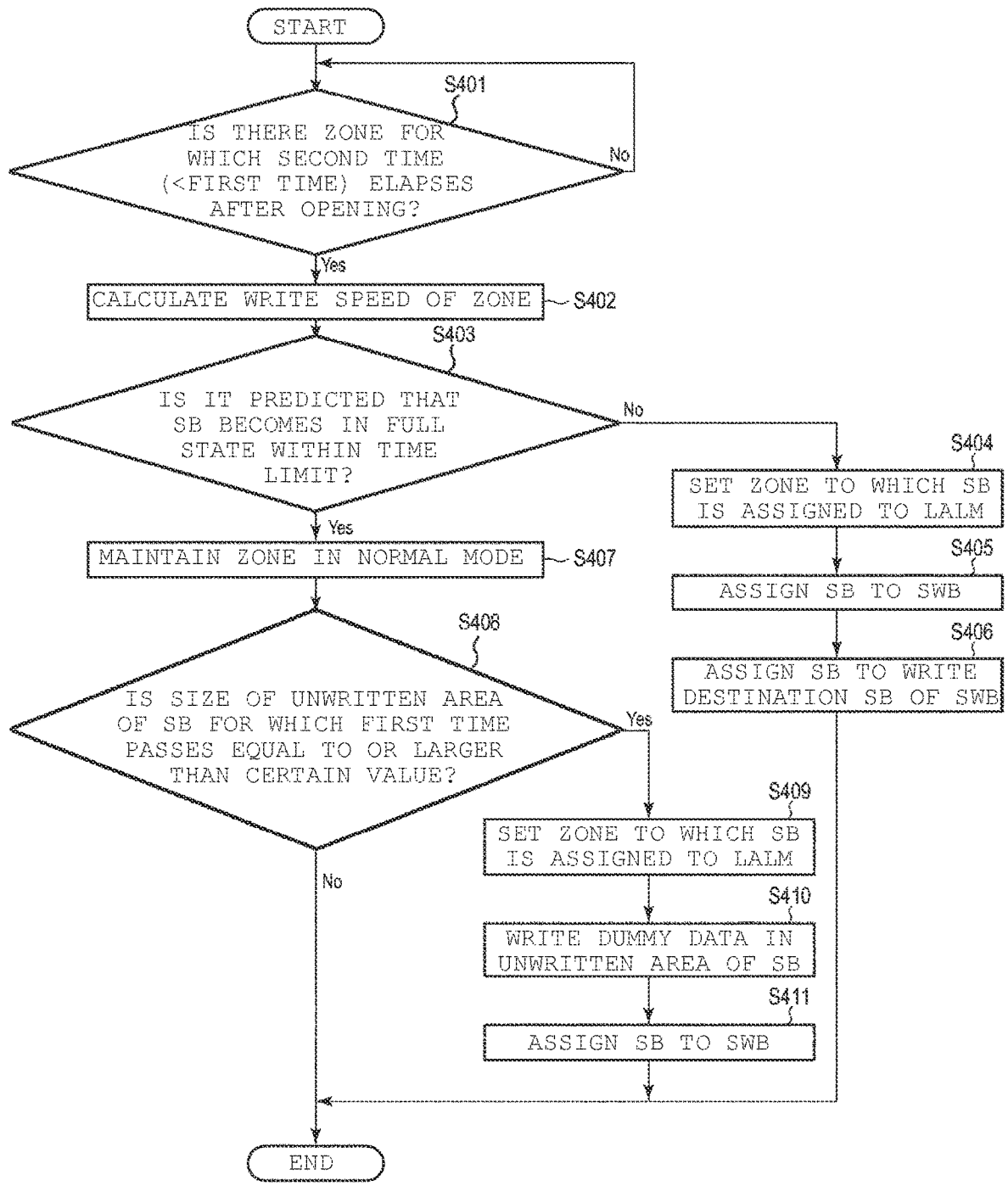
FIG. 23 is a flowchart illustrating still another procedure of the operation of shifting the write mode of any zone from the normal mode to the LALM, which is executed in the memory system according to at least one embodiment.

FIG. 23 is a flowchart illustrating still another procedure of an operation of shifting the write mode of any zone from the normal mode to the LALM, which is executed in the memory system according to the embodiment. Herein, it is assumed that the zone is set to the LALM by the third method described with reference to FIG. 13.

The controller 4 determines whether there is a zone for which a second time (<first time) elapses after opening (step S401). Herein, the second time is a time shorter than the first time. In other words, the second time is set to a time shorter than the time limit by a predetermined time.

When there is no zone for which the second time (<first time) elapses after opening (No in step S401), the controller 4 waits until there is a zone for which the second time (<first time) elapses after opening.

When there is a zone for which the second time (<first time) elapses after opening (Yes in step S401), the controller 4 calculates the write speed for the zone, that is, the write speed for the super block assigned to that zone (step S402). The controller 4 calculates the write speed based on the second time and the size of the write data written to the super block. The controller 4 predicts whether the super block will be in the full state within the time limit based on the calculated write speed, that is, based on the second time and the size of the write data written to the super block.

When it is predicted that the super block will not be in the full state within the time limit (No in step S403), the controller 4 sets the zone to which the super block is assigned to the LALM (step S404).

The controller 4 assigns the super block to the shared write buffer 201 (step S405). In other words, the controller 4 manages the super block assigned to the zone set to the LALM as the shared write buffer 201, that is, as an element of a set of the super blocks assigned to the shared write buffer 201.

The controller 4 assigns the super block to the write destination super block of the shared write buffer 201 (step S406).

When it is predicted that the super block will be in the full state within the time limit (Yes in step S403), the controller 4 maintains the zone to which the super block is assigned in the normal mode (step S407).

When the first time elapses from the opening of the zone to which the super block is assigned, the controller 4 determines whether the size of the unwritten area of the super block is equal to or larger than a certain value (step S408).

When the size of the unwritten area of the super block is not equal to or larger than a certain value (No in step S408), the controller 4 estimates that the super block will be in the full state within the time limit and ends the process. In this case, the write mode of the zone is maintained in the normal mode.

When the size of the unwritten area of the super block is equal to or larger than a certain value (Yes in step S408), the controller 4 sets the zone to which the super block is assigned to the LALM (step S409).

The controller 4 writes the dummy data generated by the controller 4 to the unwritten area of the super block (step S410). Accordingly, the super block goes into the full state. In step S410, the controller 4 may copy the valid data in the shared write buffer 201 to the unwritten area of the super block instead of writing the dummy data to the unwritten area of the super block.

The controller 4 assigns the super block set to the full state to the shared write buffer 201 (step S411). That is, the controller 4 manages the super block set to the full state as the shared write buffer 201.

The processes of steps S409 to S411 may be executed in the order as described or may be executed in any other order.

Figure 24:
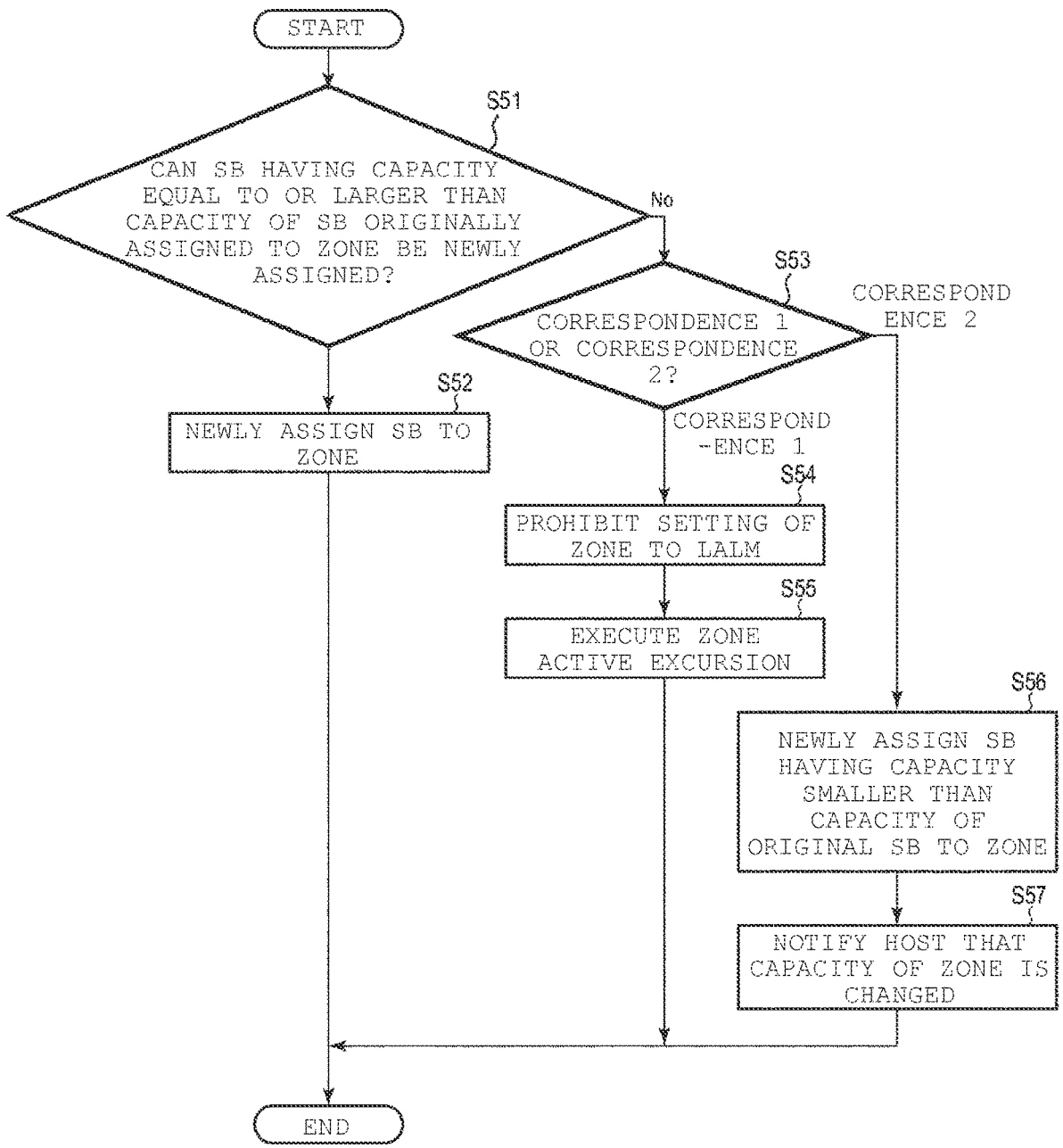
FIG. 24 is a flowchart illustrating a procedure of an operation of assigning a new block group to any zone, which is executed in the memory system according to at least one embodiment.

FIG. 24 is a flowchart illustrating a procedure of an operation of assigning a new block group to any zone, which is executed in the SSD 3 according to at least one embodiment. Herein, for example, it is assumed that a new block group is assigned to the zone by using the first example of the assignment timing described with reference to FIG. 16.

The controller 4 determines whether a super block having a capacity equal to or larger than the capacity of the super block originally assigned to the zone can be newly assigned to the zone (step S51). That is, the controller 4 determines whether there is a super block having a capacity equal to or larger than the capacity of the super block originally assigned to the zone in the super block group which can be newly assigned to the zone.

When a super block having a capacity equal to or larger than the capacity of the super block originally assigned to the zone can be newly assigned to the zone (Yes in step S51), the controller 4 newly assigns the super block to the zone (step S52). Accordingly, since the available capacity does not change before and after the assignment of the super block, the controller 4 does not need to transmit a notification to the host 2. For this reason, the controller 4 ends the process.

When a super block having a capacity equal to or larger than the capacity of the super block originally assigned to the zone cannot be newly assigned to the zone (No in step S51), the controller 4 executes Correspondence 1 or Correspondence 2 (Step S53).

In this case, whether to execute Correspondence 1 or Correspondence 2 may be determined in advance according to the intention of the user (specifically, the intention of the host software executed by the host 2). For example, the controller 4 may be configured to execute Correspondence 1 when the host software desires to execute Zone Active Excursion. When the host software desires the LALM with a capacity change notification, the controller 4 may be configured to execute Correspondence 2.

Alternatively, the controller 4 may support both a mode for executing Correspondence 1 and a mode for executing Correspondence 2. In this case, the controller 4 determines whether to execute Correspondence 1 or Correspondence 2 according to the mode specified by the host 2 (host software).

When executing the Correspondence 1 (Correspondence 1 in step S53), the controller 4 prohibits the setting of the zone to the LALM (step S54).

Then, the controller 4 executes the Zone Active Excursion (step S55). Accordingly, the controller 4 shifts the super block originally assigned to the zone to the full state. That is, the controller 4 (and the host 2) cannot write a new data to the zone.

When executing Correspondence 2 (Correspondence 2 in step S53), the controller 4 newly assigns a super block having a capacity smaller than the capacity of the original super block to the zone (step S56). Accordingly, the controller 4 changes the capacity of the zone according to the capacity of the newly assigned super block.

Then, the controller 4 notifies the host 2 that the capacity of the zone is changed (step S57). It is noted that Correspondence 2 can be executed even when the third example of the assignment timing illustrated in FIG. 18 is used.

Figure 25:
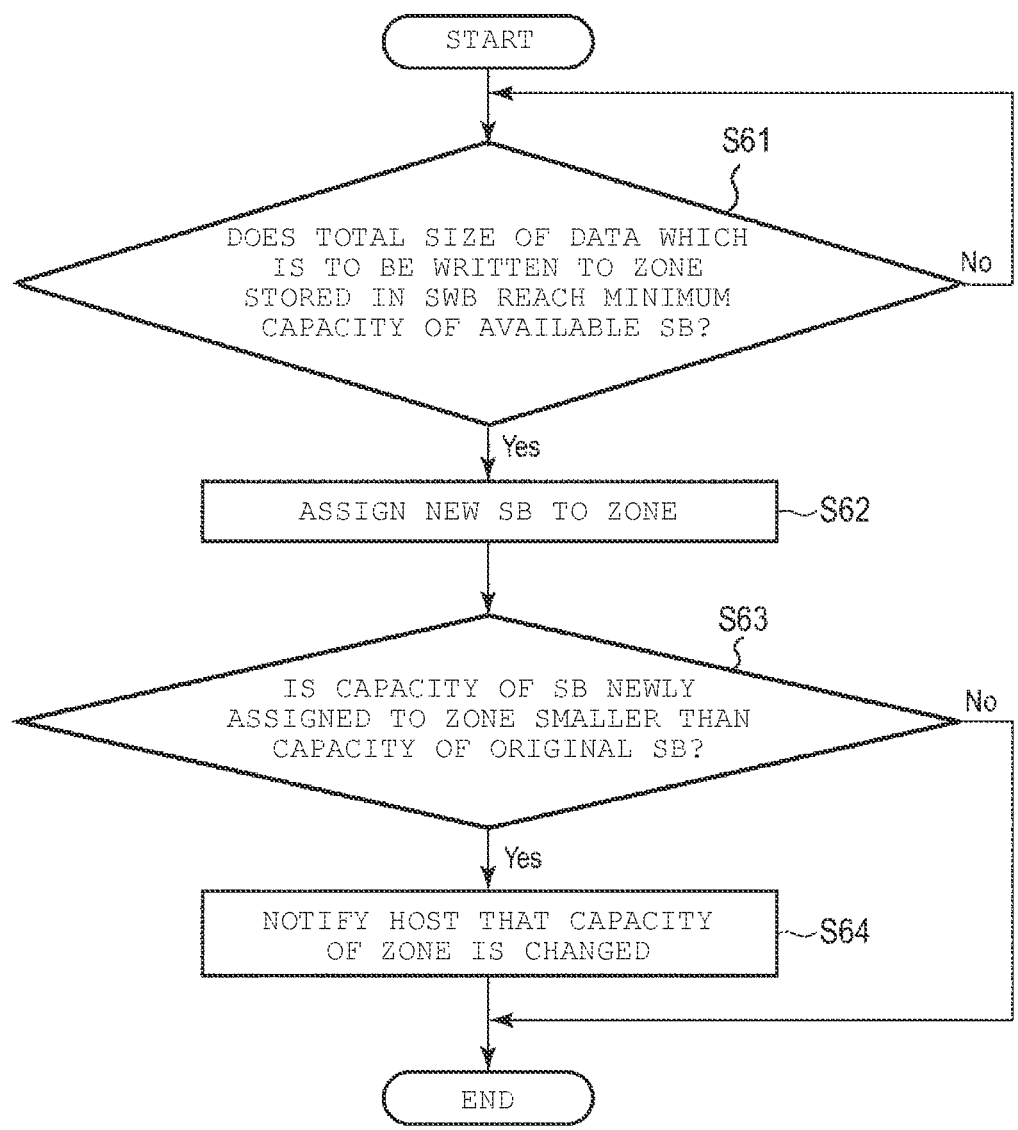
FIG. 25 is a flowchart illustrating a procedure of an operation of assigning a new block group in the third example of assignment timing, which is executed in the memory system according to at least one embodiment.

FIG. 25 is a flowchart illustrating a procedure of an operation of assigning a new block group in the third example of the assignment timing illustrated in FIG. 18, which is executed in the SSD 3 according to the embodiment.

The controller 4 determines whether the total size of the write data which is to be written to a certain zone stored in the shared write buffer 201 reaches the minimum capacity of the capacity of the available super block, that is, the minimum capacity among the capacities of a plurality of types of the super blocks (step S61).

When the total size of the write data which is to be written to a zone stored in the shared write buffer 201 does not reach the minimum capacity (No in step S61), the controller 4 waits until additional write data is written to the shared write buffer 201.

When the total size of the write data which is to be written to a certain zone stored in the shared write buffer 201 reaches the minimum capacity (Yes in step S61), the controller 4 selects any super block from the set of the free super blocks and newly assigns the selected super block to the zone (step S62).

The controller 4 determines whether the capacity of the super block newly assigned to the zone in step S62 is smaller than the capacity of the original super block (step S63).

When the capacity of the super block newly assigned to the zone in step S62 is equal to or larger than the capacity of the original super block (No in step S63), the controller 4 does not need to change the capacity of the zone, and thus ends the process.

When the capacity of the super block newly assigned to the zone in step S62 is smaller than the capacity of the original super block (Yes in step S63), the controller 4 notifies the host 2 that the capacity of the zone is changed (step S64). The changed capacity of the zone is a capacity of the newly assigned super block.

As described above, according to at least one embodiment, the controller 4 assigns a set of block groups selected from the plurality of block groups (plurality of super blocks SB) as the shared write buffer 201 for temporarily storing the write data which is to be written to each of the zones set to the first write mode (LALM) among the plurality of zones. In response to receiving the write request specifying the first zone set to the LALM among the plurality of zone from the host 2, the controller 4 writes the write data which is to be written to the first zone to the shared write buffer 201. In response to receiving the write request specifying the second zone set to the LALM among the plurality of zones from the host 2, the controller 4 writes the write data which is to be written to the second zone to the shared write buffer 201.

When, when the total size of the write data which is to be written to the first zone stored in the shared write buffer 201 reaches the capacity of the first zone, the controller 4 copies the write data which is to be written to the first zone stored in the shared write buffer 201 to the block group assigned to the first zone.

Accordingly, the writing the data having a size corresponding to the capacity of the first zone to the block group assigned to the first zone becomes possible. As a result, the block group assigned to the first zone is in a full state where the entire block group is filled with the data.

In this manner, the controller 4 starts the writing to the block group assigned to the first zone in a stage where the data having a size corresponding to the capacity of the first zone is prepared in the shared write buffer. Therefore, as compared with the case where the write data is directly written to the block group assigned to the first zone every time the write request specifying the first zone is received, the time required for the block group to be in the full state from the start of the writing to the block group assigned to the first zone can be significantly reduced. Accordingly, it is possible to alleviate the time restriction imposed on the host 2 regarding the writing to the first zone.

Similarly, when the total size of the write data which is to be written to the second zone stored in the shared write buffer 201 reaches the capacity of the second zone, the controller 4 copies the write data which is to be written to the second zone stored in the shared write buffer 201 to the block group assigned to the second zone.

Accordingly, the writing the data having a size corresponding to the capacity of the second zone to the block group assigned to the second zone becomes possible. As a result, the block group assigned to the second zone is in a full state where the entire block group is filled with the data.

Therefore, as compared with the case where the write data which is to be written to the second zone is directly written to the block group assigned to the second zone, the time required for the block group to be in the full state from the start of the writing to the block group assigned to the second zone can be significantly reduced.

Further, in at least one embodiment, until the first time elapses after the state of the first zone is shifted to the opened state where the data can be written, the controller 4 controls the first zone in the second write mode (normal mode) and writes the write data which is to be written to the first zone to the first block group assigned to the first zone in response to receiving the write request specifying the first zone from the host 2.

When the first time elapses from the shift to the opened state of the first zone in a state where the unwritten area having the first size or larger remains in the first block group, the controller 4 sets the first zone to the LALM. When the total size of the write data which is to be written to the first zone stored in the first block group and the shared write buffer reaches the capacity of the first zone, the controller 4 copies the write data which is to be written to the first zone stored in the first block group and the shared write buffer to the third block group newly assigned to the first zone.

Accordingly, the write mode of the first zone can be set to the LALM on condition that the write speed of the first zone is low. Therefore, when the write speed to the first zone is relatively high, it is not necessary to set the first zone to the LALM, and write amplification due to data copying can be minimized.

Further, in at least one embodiment, when it is specified by the host 2 that some zones are zones in which the write speed for these zones is lower than the threshold value, the controller 4 sets these zones to the LALM. Accordingly, some zones with a low write speed can be controlled in the LALM from the beginning.

Further, in at least one embodiment, when the first block group assigned to the first zone has the first capacity, and the capacity of any block group which can be newly assigned to the first zone as the third block group is smaller than the first capacity, the controller 4 executes a process (Correspondence 1) of shifting the state of the first zone to the full state without setting the first zone to the LALM or a process (Correspondence 2) of setting the first zone to the LALM and notifying the host 2 that the capacity of the first zone is changed to the second capacity of the new block group assigned to the first zone as the third block group.

Accordingly, even when the variable capacity super block is used, the shifting the write mode of each zone from the normal mode to the LALM becomes possible.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system configured to be connected to a host, the memory system comprising:

a non-volatile memory including a plurality of blocks, each block being a unit of an erasing operation; and
a controller configured to:
 manage a plurality of block groups, each of the block groups including one or more blocks among the plurality of blocks;
 assign one of the plurality of block groups to each of a plurality of logical regions;
 assign a set of block groups, selected from the plurality of block groups, as a shared write buffer being shared by each of the logical regions set to a first write mode among the plurality of logical regions;
 write first write data, which is to be written to a first logical region, to the shared write buffer in response to receiving a write request specifying the first logical region set to the first write mode among the plurality of logical regions from the host;
 write second write data, which is to be written to a second logical region, to the shared write buffer in response to receiving a write request specifying the second logical region set to the first write mode among the plurality of logical regions from the host;
 copy the first write data, which is to be written to the first logical region and stored in the shared write buffer, to a first block group assigned to the first logical region, when a total size of the first write data which is to be written to the first logical region and stored in the shared write buffer reaches a capacity of the first logical region; and
 copy the second write data, which is to be written to the second logical region and stored in the shared write buffer, to a second block group assigned to the second logical region, when a total size of the second write data which is to be written to the second logical region and stored in the shared write buffer reaches a capacity of the second logical region.

2. The memory system according to claim 1, wherein the controller is further configured to control the first logical region in a second write mode until a first time elapses after a state of the first logical region is shifted to an opened state where data can be written, and write the first write data, which is to be written to the first logical region, to the first block group in response to receiving the write request specifying the first logical region from the host.

3. The memory system according to claim 2, wherein the controller is further configured to set the first logical region to the first write mode, when the first time elapses from shift to the opened state of the first logical region in a state where an unwritten area having a first size or larger remains in the first block group.

4. The memory system according to claim 3, wherein the controller is further configured to:
 write the first write data, which is to be written to the first logical region, to the shared write buffer in response to receiving the write request specifying the first logical region from the host after setting the first logical region to the first write mode;
 write third write data, which is to be written to an other logical region, to the shared write buffer in response to receiving a write request specifying the other logical region already set to the first write mode from the host; and
 copy the first write data, which is to be written to the first logical region and stored in the first block group and the shared write buffer, to a third block group newly assigned to the first logical region, when the total size of the first write data which is to be written to the first logical region and stored in the first block group and the shared write buffer, reaches the capacity of the first logical region.

5. The memory system according to claim 1, wherein the controller is further configured to:
 control the second logical region in a second write mode until a first time elapses after a state of the second logical region is shifted to an opened state where data can be written; and
 write the second write data, which is to be written to the second logical region, to the second block group in response to receiving the write request specifying the second logical region from the host.

6. The memory system according to claim 5, wherein the controller is further configured to set the second logical region to the first write mode when the first time elapses from shift to the opened state of the second logical region in a state where an unwritten area having a first size or larger remains in the second block group.

7. The memory system according to claim 6, wherein the controller is further configured to:
 write the second write data, which is to be written to the second logical region, to the shared write buffer in response to receiving the write request specifying the second logical region from the host after setting the second logical region to the first write mode;
 write third write data, which is to be written to an other logical region, to the shared write buffer in response to receiving a write request specifying the other logical region already set to the first write mode from the host; and
 copy the second write data, which is to be written to the second logical region and stored in the second block group and the shared write buffer, to a fourth block group newly assigned to the second logical region, when the total size of the second write data which is to be written to the second logical region and stored in the second block group and the shared write buffer, reaches the capacity of the second logical region.

8. The memory system according to claim 2, wherein the controller is further configured to:
 when the first time elapses from the shift to the opened state of the first logical region in a state where the unwritten area having the first size or larger remains in the first block group,
 assign the first block group to the shared write buffer, and
 set the first block group to be in a full state by writing dummy data generated by the controller to the unwritten area of the first block group, or by copying to the unwritten area valid data of the other logical region already set to the first write mode from a garbage collection source block selected from a set of the block groups provided in the shared write buffer.

9. The memory system according to claim 5, wherein the controller is further configured to:
 when the first time elapses from the shift to the opened state of the second logical region in a state where the unwritten area having the first size or larger remains in the second block group,
 assign the second block group to the shared write buffer, and
 set the second block group to be in a full state by writing dummy data generated by the controller to the unwritten area of the second block group, or by copying to the unwritten area valid data of the other logical region already set to the first write mode from a garbage collection source block selected from a set of the block groups provided in the shared write buffer.

10. The memory system according to claim 2, wherein; the first time is set to a time shorter than a time limit indicating a time allowed for the block group to be in the full state from the execution of the erasing operation on each block group by a predetermined time, and wherein the controller is further configured to:
   predict whether the first block group is in the full state within the time limit based on the first time and the total size of the first write data written to the first block group when the first time elapses after the state of the first logical region is shifted to the opened state; and
   when it is predicted that the first block group is not in the full state within the time limit,
      set the first logical region to the first write mode,
      assign the first block group to the shared write buffer as a write destination block group to which the first write data for the first logical region, and third write data for an other logical region already set to the first write mode, are to be written;
      write fourth write data, which is to be written to the first logical region to the first block group assigned as the write destination block group, in response to receiving the write request specifying the first logical region from the host; and
      write fifth write data, which is to be written to the other logical region to the first block group assigned as the write destination block group, in response to receiving the write request specifying the other logical region from the host.

11. The memory system according to claim 5, wherein: the first time is set to a time shorter than the time limit indicating a time allowed for the block group to be in the full state from the execution of the erasing operation on each block group by a predetermined time, and wherein the controller is further configured to:
   predict whether the second block group is in the full state within the time limit based on the first time and based on the total size of the first write data written to the first block group when the first time elapses after the state of the second logical region is shifted to the opened state; and
   when it is predicted that the second block group is not in the full state within the time limit,
      set the second logical region to the first write mode;
      assign the second block group to the shared write buffer as a write destination block group to which the first write data for the first logical region, and third write data for an other logical region already set to the first write mode, are to be written;
      write fourth write data, which is to be written to the second logical region to the second block group assigned as the write destination block group, in response to receiving the write request specifying the second logical region from the host, and
      write fifth write data, which is to be written to the other logical region to the second block group assigned as the write destination block group, in response to receiving the write request specifying the other logical region from the host.

12. The memory system according to claim 1, wherein the controller is further configured to:
   set the first logical region to the first write mode when it is specified by the host that the first logical region is a logical region in which a write speed for the first logical region is lower than a threshold value; and
   set the second logical region to the first write mode when it is specified by the host that the second logical region is a logical region in which a write speed for the second logical region is lower than a threshold value.

13. The memory system according to claim 4, wherein: the plurality of block groups have different capacities, the controller is further configured to:
   when the first block group assigned to the first logical region has a first capacity, and a capacity of any one block group which can be newly assigned to the first logical region as the third block group is lower than the first capacity,
      execute (1) a process of shifting a state of the first logical region to a full state without setting the first logical region to the first write mode; or
      execute (2) a process of setting the first logical region to the first write mode and notifying the host that the capacity of the first logical region is changed to a second capacity of the new block group assigned to the first logical region as the third block group.

14. The memory system according to claim 13, wherein the controller is further configured to assign a new block group to be used as the third block group to the first logical region in response to determination that the first time elapses from the shift to the opened state of the first logical region in the state where the unwritten area having the first size or larger remains in the first block group.

15. The memory system according to claim 4, wherein: the plurality of block groups have different capacities, and the controller is further configured to:
   assign a new block group to be used as the third block group to the first logical region when the total size of the first write data, which is to be written to the first logical region and stored in the first block group and the shared write buffer, reaches a minimum capacity among the capacities of the plurality of block groups;
   notify the host that the capacity of the first logical region is changed to a second capacity of the new block group assigned to the first logical region as the third block group, when the first block group assigned to the first logical region has a first capacity and the capacity of any one block group which can be newly assigned to the first logical region as the third block group is also smaller than the first capacity; and
   copy the first write data, which is to be written to the first logical region and stored in the first block group and the shared write buffer, to the new block group assigned to the first logical region when the total size of the first write data, which is to be written to the first logical region and stored in the first block group and the shared write buffer, reaches the second capacity.

16. A method of controlling a non-volatile memory, the non-volatile memory including a plurality of blocks, each block being a unit of an erasing operation, the method comprising:
   managing a plurality of block groups, each of the block groups including one or more blocks among the plurality of blocks;
   assigning one of the plurality of block groups to each of a plurality of logical regions;

assigning a set of block groups, selected from the plurality of block groups, as a shared write buffer being shared by each of the logical regions set to a first write mode among the plurality of logical regions;

receiving a write request specifying a first logical region set to the first write mode among the plurality of logical regions from a host;

writing first write data, which is to be written to the first logical region, to the shared write buffer in response to receiving the write request specifying the first logical region;

receiving a write request specifying a second logical region set to the first write mode among the plurality of logical regions from the host;

writing second write data, which is to be written to the second logical region, to the shared write buffer in response to receiving the write request specifying the second logical region;

determining that a total size of the first write data which is to be written to the first logical region and stored in the shared write buffer reaches a capacity of the first logical region;

copying the first write data, which is to be written to the first logical region and stored in the shared write buffer, to a first block group assigned to the first logical region, in response to determining that the total size of the first write data which is to be written to the first logical region and stored in the shared write buffer reaches the capacity of the first logical region;

determining that a total size of the second write data which is to be written to the second logical region and stored in the shared write buffer reaches a capacity of the second logical region; and copying the second write data, which is to be written to the second logical region and stored in the shared write buffer, to a second block group assigned to the second logical region, in response to determining that the total size of the second write data which is to be written to the second logical region and stored in the shared write buffer reaches the capacity of the second logical region.

17. The method according to claim 16, further comprising:
controlling the first logical region in a second write mode until a first time elapses after a state of the first logical region is shifted to an opened state where data can be written; and writing the first write data, which is to be written to the first logical region, to the first block group in response to receiving the write request specifying the first logical region.

18. The method according to claim 17, further comprising:
determining that the first time elapses from shift to the opened state of the first logical region in a state where an unwritten area having a first size or larger remains in the first block group; and setting the first logical region to the first write mode, in response to determining that the first time elapses from the shift to the opened state of the first logical region in the state where the unwritten area having the first size or larger remains in the first block group.

19. The method according to claim 16, further comprising:
controlling the second logical region in a second write mode until a first time elapses after a state of the second logical region is shifted to an opened state where data can be written; and writing the second write data, which is to be written to the second logical region, to the second block group in response to receiving the write request specifying the second logical region from the host.

20. The method according to claim 16, further comprising:
determining that the host specifies the first logical region to be a logical region in which a write speed for the first logical region is lower than a first threshold value;

in response to determining that the host specifies the first logical region to be a logical region in which the write speed for the first logical region is lower than the first threshold value, setting the first logical region to the first write mode;

determining that the host specifies the second logical region to be a logical region in which a write speed for the second logical region is lower than a threshold value; and in response to determining that the host specifies the second logical region to be a logical region in which the write speed for the second logical region is lower than a second threshold value, setting the second logical region to the first write mode.

* * * * *